(12) United States Patent
Milton et al.

(10) Patent No.: US 10,981,609 B2
(45) Date of Patent: Apr. 20, 2021

(54) SYSTEMS, METHODS, AND DEVICES FOR AN AUTOMOBILE DOOR OR WINDOW

(71) Applicant: Nikola Corporation, Phoenix, AZ (US)

(72) Inventors: Trevor R. Milton, Phoenix, AZ (US);
Stephen Jennes, Glendale, AZ (US);
Markus Scholten, Phoenix, AZ (US)

(73) Assignee: Nikola Corporation, Phoenix, AZ (US)

( * ) Notice: Subject to any disclaimer, the term of this patent is extended or adjusted under 35 U.S.C. 154(b) by 98 days.

(21) Appl. No.: 16/412,748

(22) Filed: May 15, 2019

(65) Prior Publication Data

US 2019/0263455 A1 Aug. 29, 2019

Related U.S. Application Data

(60) Continuation-in-part of application No. 15/410,130, filed on Jan. 19, 2017, now Pat. No. 10,370,041, (Continued)

(51) Int. Cl.
*B62D 35/00* (2006.01)
*B62D 33/06* (2006.01)
(Continued)

(52) U.S. Cl.
CPC ........ *B62D 33/0612* (2013.01); *B60J 5/0497* (2013.01); *B60J 5/062* (2013.01);
(Continued)

(58) Field of Classification Search
CPC .. B62D 35/001; B62D 35/002; B62D 35/005; B62D 37/02; B62D 33/06; B62D 33/0612
(Continued)

(56) References Cited

U.S. PATENT DOCUMENTS 2,866,651 A 12/1958 Powell
2,971,772 A 2/1961 Tanhinger et al.
(Continued)

FOREIGN PATENT DOCUMENTS

BR 405014 6/2006
CN 201399316 4/2013
(Continued)

OTHER PUBLICATIONS www.michelinchallengedesign.com/the-challenge-archives/2010-electryfying/2010-showcase-of-selected-entrants/road-runner-by-adriano-mudri-austria/ (available at web.archive.org/web/20150810062659/https://www.michelinchallengedesign.com/the-challenge-archives/2010-electrifying/2010-showcase-of-selected-entrants/road-runner-by-adriano-mudri-austria/) (previously available at www.michelinchallengedesign.com/MCD_2010/mcd_2010_gallery_d26.asp (no longer available, published at least as early as May 17, 2010, visible at web.archive.
(Continued)

*Primary Examiner* — Gregory A Blankenship
(74) *Attorney, Agent, or Firm* — Snell & Wilmer L.L.P.

(57) ABSTRACT

A trailer truck is the combination of a truck and one or more trailers used to haul freight. A trailer attaches to the truck via a trailer coupling (hitch), with much of its weight borne by the truck. The result is that both the truck and the trailer will have a distinctly different design than a rigid truck and trailer. Exemplary vehicles are provided, such as heavy duty trucks having truck bodies with improved aerodynamic characteristics, including improved drag coefficients.

20 Claims, 17 Drawing Sheets

Related U.S. Application Data which is a division of application No. 15/396,209, filed on Dec. 30, 2016, now Pat. No. 10,077,084, which is a continuation-in-part of application No. 15/357,350, filed on Nov. 21, 2016, now Pat. No. 10,207,751.

(60) Provisional application No. 62/391,745, filed on May 9, 2016, provisional application No. 62/273,256, filed on Dec. 30, 2015, provisional application No. 62/391,745, filed on May 9, 2016.

(51) Int. Cl.

| | | |
|---|---|---|
| *B60R 3/00* | (2006.01) | |
| *B60K 6/20* | (2007.10) | |
| *E05F 15/73* | (2015.01) | |
| *E05F 15/60* | (2015.01) | |
| *B60J 5/06* | (2006.01) | |
| *E05F 15/70* | (2015.01) | |
| *E05F 15/632* | (2015.01) | |
| *B60K 6/26* | (2007.10) | |
| *B60N 3/00* | (2006.01) | |
| *B60J 5/04* | (2006.01) | |
| *B60N 3/16* | (2006.01) | |
| *B60N 3/10* | (2006.01) | |
| *E05D 15/06* | (2006.01) | |
| *E05F 15/41* | (2015.01) | |
| *B60K 6/28* | (2007.10) | |
| *B60L 58/26* | (2019.01) | |

(52) U.S. Cl.
CPC ............... *B60K 6/20* (2013.01); *B60K 6/26* (2013.01); *B60N 3/001* (2013.01); *B60N 3/008* (2013.01); *B60N 3/10* (2013.01); *B60N 3/16* (2013.01); *B60R 3/00* (2013.01); *B62D 35/001* (2013.01); *B62D 35/005* (2013.01); *E05D 15/0604* (2013.01); *E05F 15/41* (2015.01); *E05F 15/60* (2015.01); *E05F 15/632* (2015.01); *E05F 15/70* (2015.01); *E05F 15/73* (2015.01); *B60K 6/28* (2013.01); *B60L 58/26* (2019.02); *E05Y 2900/516* (2013.01); *Y10S 903/906* (2013.01); *Y10S 903/907* (2013.01)

(58) Field of Classification Search
USPC ... 296/190.01, 190.02, 190.08, 180.1, 180.2; D12/93, 96
See application file for complete search history.

(56) References Cited

U.S. PATENT DOCUMENTS

| | | | |
|---|---|---|---|
| 2,998,264 A | 8/1961 | Stump | |
| 3,007,716 A | 11/1961 | Maharick | |
| 3,477,738 A | 11/1969 | Manning | |
| 3,696,732 A * | 10/1972 | Rodgers | B62D 33/06 296/91 |
| 3,711,146 A * | 1/1973 | Madzsar | B62D 35/001 296/180.2 |
| 3,831,699 A | 8/1974 | Wolter | |
| 3,878,914 A * | 4/1975 | Gulich | B62D 35/001 180/89.19 |
| 3,929,202 A | 12/1975 | Hobbensiefken | B62D 49/005 180/68.4 |
| D242,996 S | 1/1977 | Servais | B60K 1/00 D12/97 |
| 4,174,855 A | 11/1979 | Vandenberg | |
| 4,201,415 A * | 5/1980 | Suchanek | B60K 11/00 180/68.1 |
| 4,274,338 A | 6/1981 | Uozumi | |
| 4,301,570 A | 11/1981 | Thomas | |
| 4,313,619 A | 2/1982 | Hailer | |
| 4,351,554 A | 9/1982 | Miller | |
| 4,436,177 A | 3/1984 | Elliston | |
| D291,674 S * | 9/1987 | Smith | B62D 35/001 D12/96 |
| D291,872 S * | 9/1987 | Simons | B62D 33/06 296/180.2 |
| 4,813,704 A | 3/1989 | Smith | |
| 4,813,736 A | 3/1989 | Schubert et al. | |
| 4,932,716 A * | 6/1990 | Marlowe | B62D 33/06 296/180.2 |
| 4,957,322 A * | 9/1990 | Marlowe | B62D 35/001 296/180.2 |
| 4,974,872 A | 12/1990 | Riese | |
| 4,991,906 A | 2/1991 | Fingerle | |
| 5,025,591 A | 6/1991 | DeLand et al. | |
| 5,083,834 A | 1/1992 | Moffatt et al. | |
| 5,201,379 A * | 4/1993 | Penzotti | B62D 33/0612 180/89.18 |
| D339,314 S * | 9/1993 | Moar | D12/96 |
| D357,436 S * | 4/1995 | Moar | D12/96 |
| 5,396,968 A | 9/1995 | Hasebe et al. | |
| 5,413,462 A | 9/1995 | Alberni | |
| D392,597 S * | 3/1998 | Brounstein | D12/97 |
| 5,879,265 A | 3/1999 | Bek | |
| 5,927,417 A | 7/1999 | Brunner et al. | |
| 6,065,800 A * | 5/2000 | Olson | B62D 33/06 296/190.08 |
| 6,179,312 B1 | 1/2001 | Paschke et al. | |
| 6,213,531 B1 | 4/2001 | Corey et al. | |
| 6,290,244 B1 | 9/2001 | Hosoya | |
| 6,349,782 B1 | 2/2002 | Sekiya et al. | |
| 6,357,769 B1 | 3/2002 | Omundson et al. | |
| 6,428,027 B1 | 8/2002 | Stuart | |
| 6,840,525 B1 | 1/2005 | Griffiths | |
| 6,866,295 B2 | 3/2005 | Ziech et al. | |
| 6,886,647 B1 | 5/2005 | Gotta | |
| 6,904,717 B2 | 6/2005 | Clark et al. | |
| 7,464,779 B2 | 12/2008 | Grabmaier et al. | |
| 7,621,835 B2 | 11/2009 | Oshidari | |
| 7,637,557 B2 | 12/2009 | Regnell et al. | |
| 7,819,411 B2 | 10/2010 | Eshelman et al. | |
| D626,890 S * | 11/2010 | Cantemir | D12/93 |
| 7,971,890 B2 | 7/2011 | Richardson | |
| 8,402,878 B2 | 3/2013 | Schreiner et al. | |
| 8,402,879 B2 | 3/2013 | Schreiner et al. | |
| 8,579,308 B2 | 11/2013 | Weeks et al. | |
| 8,640,801 B2 | 2/2014 | Hennings et al. | |
| 8,678,118 B2 | 3/2014 | Takenaka et al. | |
| 8,960,341 B2 | 2/2015 | Weber | |
| 9,108,688 B2 | 8/2015 | Stutz | |
| 9,221,496 B2 | 12/2015 | Barr | |
| 9,266,423 B2 | 2/2016 | Hoshinoya et al. | |
| 9,533,711 B2 | 1/2017 | Hirsch et al. | |
| D811,944 S * | 3/2018 | Milton | B62D 35/001 D12/99 |
| D814,357 S * | 4/2018 | Milton | B62D 33/06 D12/93 |
| D814,979 S | 4/2018 | Cantuem et al. | |
| D825,391 S * | 8/2018 | Von Holzhausen | B60K 11/00 D12/96 |
| D825,392 S * | 8/2018 | Von Holzhausen | D12/96 |
| 10,077,084 B2 | 9/2018 | Milton et al. | |
| D859,217 S * | 9/2019 | Von Holzhausen | B62D 35/001 D12/96 |
| D860,056 S * | 9/2019 | Von Holzhausen | B62D 35/001 D12/96 |
| D871,972 S * | 1/2020 | Smith | D12/93 |
| 2002/0163174 A1 | 11/2002 | Bell et al. | |
| 2003/0064846 A1 | 4/2003 | Klemen et al. | |
| 2003/0098564 A1 | 5/2003 | Vandenberg et al. | |
| 2003/0122340 A1 | 7/2003 | Varela | |
| 2004/0032149 A1 | 2/2004 | Ljungquist et al. | |
| 2004/0150142 A1 | 8/2004 | Warinner et al. | |

(56) References Cited

U.S. PATENT DOCUMENTS

| | | | |
|---|---|---|---|
| 2004/0183271 | A1 | 9/2004 | Galazin et al. |
| 2006/0192361 | A1 | 8/2006 | Anderson et al. |
| 2006/0208447 | A1 | 9/2006 | Eshelman et al. |
| 2007/0075566 | A1 | 4/2007 | Lindemann et al. |
| 2007/0200390 | A1 | 8/2007 | Lotarev et al. |
| 2007/0259747 | A1 | 11/2007 | Thomas et al. |
| 2008/0179116 | A1 | 7/2008 | Ikenoya et al. |
| 2008/0181515 | A1 | 8/2008 | Hollenbeck |
| 2008/0191515 | A1 | 8/2008 | Hollenbeck |
| 2008/0231074 | A1 | 9/2008 | Suzuki |
| 2008/0315546 | A1 | 12/2008 | Kucinski et al. |
| 2009/0014223 | A1 | 1/2009 | Jones et al. |
| 2009/0057050 | A1 | 3/2009 | Shino et al. |
| 2009/0107050 | A1 | 4/2009 | Suzuki |
| 2009/0224569 | A1 | 9/2009 | Lagrut |
| 2010/0025131 | A1 | 2/2010 | Gloceri et al. |
| 2010/0038877 | A1 | 2/2010 | Cortez et al. |
| 2010/0060036 | A1 | 3/2010 | Orii |
| 2010/0117318 | A1 | 5/2010 | Grozev et al. |
| 2010/0122871 | A1 | 5/2010 | Gottlinger |
| 2010/0276901 | A1 | 11/2010 | Richardson et al. |
| 2011/0089716 | A1* | 4/2011 | Hall ............... B62D 33/06 296/180.2 |
| 2011/0114398 | A1 | 5/2011 | Bianco |
| 2011/0121606 | A1 | 5/2011 | Engelbrecht et al. |
| 2011/0214947 | A1 | 9/2011 | Tuomas |
| 2013/0069391 | A1 | 3/2013 | Hall et al. |
| 2013/0175779 | A1 | 7/2013 | Kvien et al. |
| 2013/0187405 | A1* | 7/2013 | Ballarin ............ B62D 35/001 296/180.4 |
| 2014/0182954 | A1 | 7/2014 | Weber |
| 2014/0327220 | A1 | 11/2014 | Holt et al. |
| 2015/0266373 | A1 | 9/2015 | Wang |
| 2016/0076610 | A1 | 3/2016 | White et al. |
| 2017/0197495 | A1* | 7/2017 | Milton ............... B60J 5/0497 |
| 2017/0240219 | A1 | 8/2017 | Milton et al. |
| 2017/0320365 | A1 | 11/2017 | Lorenz et al. |
| 2017/0320366 | A1* | 11/2017 | Milton ............... B60K 1/00 |
| 2017/0320367 | A1 | 11/2017 | Milton et al. |
| 2017/0320522 | A1 | 11/2017 | Lorenz et al. |
| 2018/0237070 | A1 | 8/2018 | Lorenz et al. |
| 2019/0263455 | A1* | 8/2019 | Milton ............... B62D 33/0612 |
| 2019/0329635 | A1* | 10/2019 | Milton ............... B60J 5/0488 |
| 2020/0023911 | A1* | 1/2020 | Otterstrom ......... B62D 35/02 |
| 2020/0156712 | A1* | 5/2020 | Hermann ............ B60Q 1/24 |
| 2020/0369161 | A1* | 11/2020 | Lee .................... B62D 63/025 |

FOREIGN PATENT DOCUMENTS

| | | |
|---|---|---|
| DE | 3136305 | 3/1983 |
| DE | 19660230 | 2/2000 |
| DE | 102011084858 | 4/2013 |
| DE | 21201300035 | 7/2015 |
| EP | 931684 | 7/1999 |
| EP | 742113 | 10/2001 |
| EP | 1724130 | 11/2006 |
| EP | 1900554 | 11/2011 |
| EP | 1628854 | 11/2012 |
| JP | 6-64419 | 8/1994 |
| WO | 2001023245 | 4/2001 |
| WO | 2001051300 | 7/2015 |
| WO | 20150110965 | 7/2015 |
| WO | 2017117572 A1 | 7/2017 |

OTHER PUBLICATIONS

USPTO; Non-Final Office Action in the U.S. Appl. No. 15/396,209 dated Aug. 3, 2017.
USPTO; Final Office Action in the U.S. Appl. No. 15/396,209 dated Mar. 21, 2018.
USPTO; Advisory Action in the U.S. Appl. No. 15/396,209 dated Jun. 19, 2018.
USPTO; Notice of Allowance in the U.S. Appl. No. 15/396,209 dated Jul. 25, 2018.
USPTO; Non-Final Office Action in the U.S. Appl. No. 15/410,130 dated Mar. 21, 2018.
USPTO; Final Office Action in the U.S. Appl. No. 15/410,130 dated Sep. 13, 2018.
USPTO; Notice of Allowance in the U.S. Appl. No. 15/410,130 dated Mar. 20, 2019.
USPTO; Non-Final Office Action in the U.S. Appl. No. 15/889,159 dated Oct. 12, 2018.
USPTO; Final Office Action in the U.S. Appl. No. 15/889,159 dated Apr. 9, 2019.
USPTO; Advisory Action in the U.S. Appl. No. 15/889,159 dated May 20, 2019.
USPTO; Non-Final Office Action in the U.S. Appl. No. 15/889,159 dated Aug. 6, 2019.
USPTO; Non-Final Office Action in the U.S. Appl. No. 15/889,159 dated Sep. 30, 2019.
PCT International Search Report dated Sep. 6, 2017, Application No. PCT/US2017031056, Applicant Bluegentech, LLC.
PCT Written Opinion of the International Search Authority dated Sep. 6, 2017, Application No. PCT/US2017031056, Applicant Bluegentech, LLC.
PCT International Search Report dated Jul. 20, 2017, Application No. PCT/US2017/031651, Applicant Bluegentech, LLC.
PCT Written Opinion of the International Search Authority dated Jul. 20, 2017, Application No. PCT/US2017/031651, Applicant Bluegentech, LLC.
PCT International Search Report dated Jul. 17, 2017, Application No. PCT/US2017/031653, Applicant Bluegentech, LLC.
PCT Written Opinion of the International Search Authority dated Jul. 17, 2017, Application No. PCT/US2017/031653, Applicant Bluegentech, LLC.
Extended European Search Report dated Aug. 25, 2017, Application No. 17169629.7-1755, Applicant ArvinMeritor Technology, LLC.
Extended European Search Report dated Sep. 7, 2017, Application No. 17169640.4-1755, Applicant, ArvinMeritor Technology, LLC.
USPTO, Non Final Office Action dated Oct. 6, 2017 in U.S. Appl. No. 15/357,350.
USPTO, Final Office Action dated Apr. 17, 2018 in U.S. Appl. No. 15/357,350.
USPTO, Notice of Allowance dated Jul. 27, 2018 in U.S. Appl. No. 15/357,350.
USPTO, Corrected Notice of Allowance dated Jan. 23, 2019 in U.S. Appl. No. 15/357,350.
USPTO; Non-Final Office Action dated Apr. 2, 2018, U.S. Appl. No. 15/366,452.
USPTO; Amendment Under 37 CFR 1.111 filed Oct. 1, 2018, U.S. Appl. No. 15/366,452.
USPTO; Non-Final Office Action dated Dec. 14, 2018, U.S. Appl. No. 15/366,452.
USPTO, Final Office Action dated Jun. 14, 2019 in U.S. Appl. No. 15/366,452.
USPTO, Notice of Allowance dated Aug. 27, 2019 in U.S. Appl. No. 15/366,452.
USPTO, Corrected Notice of Allowance dated Jan. 9, 2020 in U.S. Appl. No. 15/366,452.
USPTO, Corrected Notice of Allowance dated Feb. 12, 2020 in U.S. Appl. No. 15/366,452.
USPTO; Non-Final Office Action dated Apr. 3, 2018, U.S. Appl. No. 15/366,472.
USPTO; Amendment Under 37 CFR 1.111 filed Sep. 4, 2018, U.S. Appl. No. 15/366,472.
USPTO; Final Office Action dated Dec. 11, 2018, U.S. Appl. No. 15/366,472.
USPTO, Notice of Allowance dated Feb. 27, 2019 in U.S. Appl. No. 15/366,472.
USPTO; Notice of Allowance dated Jun. 26, 2018, U.S. Appl. No. 15/498,557.
USPTO; Notice of Allowance dated Dec. 5, 2018, U.S. Appl. No. 15/498,557.
USPTO, Corrected Notice of Allowance dated Feb. 19, 2019 in U.S. Appl. No. 15/498,557.

(56) References Cited

OTHER PUBLICATIONS

USPTO, Corrected Notice of Allowance dated Mar. 13, 2019 in U.S. Appl. No. 15/498,557.
USPTO; Non-Final Office Action dated Oct. 18, 2018, U.S. Appl. No. 15/498,550.
USPTO, Notice of Allowance dated Apr. 19, 2019 in U.S. Appl. No. 15/498,550.
USPTO; Non-Final Office Action dated May 19, 2020 in U.S. Appl. No. 16/359,886.
USPTO; Notice of Allowance dated Aug. 24, 2020 in U.S. Appl. No. 16/359,886.
USPTO, Final Office Action dated Jan. 16, 2020 in U.S. Appl. No. 15/889,159.
USPTO, Notice of Allowance dated Feb. 12, 2020 in U.S. Appl. No. 15/889,159.
USPTO; Non-Final Office Action dated Dec. 11, 2020 in U.S. Appl. No. 16/509,073.

\* cited by examiner

SYSTEMS, METHODS, AND DEVICES FOR AN AUTOMOBILE DOOR OR WINDOW

CROSS-REFERENCE TO RELATED APPLICATIONS

This application is a continuation-in-part of U.S. patent application Ser. No. 15/410,130, filed Jan. 19, 2017, now U.S. Pat. No. 10,370,041 entitled "SYSTEMS, METHODS, AND DEVICES FOR AN AUTOMOBILE DOOR OR WINDOW." U.S. patent application Ser. No. 15/410,130 is a divisional of U.S. patent application Ser. No. 15/396,209 filed Dec. 30, 2016, now U.S. Pat. No. 10,077,084 entitled "SYSTEMS, METHODS, AND DEVICES FOR AN AUTOMOBILE DOOR OR WINDOW." U.S. patent application Ser. No. 15/396,209 claims priority to, and the benefit of, U.S. Provisional Application Ser. No. 62/391,745 filed on May 9, 2016 entitled "MOTOR GEARBOX ASSEMBLY," and U.S. Provisional Application Ser. No. 62/273,256 filed on Dec. 30, 2015 entitled "SYSTEMS, METHODS, AND DEVICES FOR AN AUTOMOBILE DOOR OR WINDOW." U.S. patent application Ser. No. 15/396,209 is also a continuation-in-part of U.S. patent application Ser. No. 15/357,350 filed on Nov. 21, 2016, now U.S. Pat. No. 10,207,751 entitled "MOTOR GEARBOX ASSEMBLY," which likewise claims priority to, and the benefit of, U.S. Provisional Application Ser. No. 62/391,745 filed on May 9, 2016 entitled "MOTOR GEARBOX ASSEMBLY." The disclosures of all the foregoing applications are incorporated herein by reference in their entireties, including but not limited to those portions that specifically appear hereinafter, but except for any subject matter disclaimers or disavowals, and except to the extent that the incorporated material is inconsistent with the express disclosure herein, in which case the language in this disclosure shall control.

TECHNICAL FIELD

The disclosure relates generally to systems, methods, and devices for automobiles and corresponding automobile bodies, and more particularly, to methods, systems, and devices for semi-truck vehicles.

BACKGROUND

A trailer truck (more commonly known as a "semi-truck" or simply a "semi") is the combination of a truck (also called a "tractor unit") and one or more trailers used to haul freight. A trailer attaches to the truck via a trailer coupling (e.g., a hitch), with much of its weight borne by the truck. The result is that both the truck and the trailer will have a distinctly different design than a rigid truck and trailer.

Conventional trucks typically have large displacement diesel engines for power, durability, and economy; several axles; and a multi-ratio transmission (10, 13, or 18 gears) for maximum flexibility in gearing. The truck and trailer combination distributes a load across multiple axles while being more maneuverable than an equivalently sized rigid truck. The most common trailer coupling system is a fifth wheel coupling, allowing rapid shift between trailers performing different functions, such as a bulk tipper and box trailer. Trailers containing differing cargos can be rapidly swapped between trucks, eliminating downtime while a trailer is unloaded or loaded.

More recently, trucks have been developed with electric motors powered by a large bank of batteries. The advantage of electric motors is that they provide higher horsepower and torque as compared to diesel motors. In addition, electric motors provide zero emissions and increased range. Electric motors also provide increased speed during ascents and the ability to charge the batteries during descents.

While improvements in motor technology have been advantageous to the overall performance, speed, range, and abilities of trucks, the performance of the tractor units may be further enhanced by implementing features in a manner to increase aerodynamic characteristics. Previously available truck designs have included bodies that generated high amounts of drag at cruising speeds. This drag results in reduced fuel economy as well as a drop in top speed and overall performance.

The reduction of drag in trucks leads to increases in the top speed and the fuel efficiency of the vehicles, as well as many other performance characteristics, such as handling and acceleration. The two main factors that impact drag are the frontal area of the vehicle and a common aerodynamic measure in vehicle design known as the "drag coefficient." The drag coefficient is a unit-less value that denotes how much an object resists movement through the air. The lower the drag coefficient, the better the performance of a vehicle. Lowering the drag coefficient typically comes from streamlining the exterior body of the vehicle.

Accordingly, it would be an improvement over the prior art to provide an exterior body for a truck with a low drag coefficient at operational speeds.

BRIEF DESCRIPTION OF THE DRAWINGS

Non-limiting and non-exhaustive embodiments of the present disclosure are described with reference to the following figures, wherein like reference numerals refer to like parts throughout the various views unless otherwise specified. Advantages of the present disclosure will become better understood with regard to the following description and accompanying drawings where.

DETAILED DESCRIPTION

Figure 1:
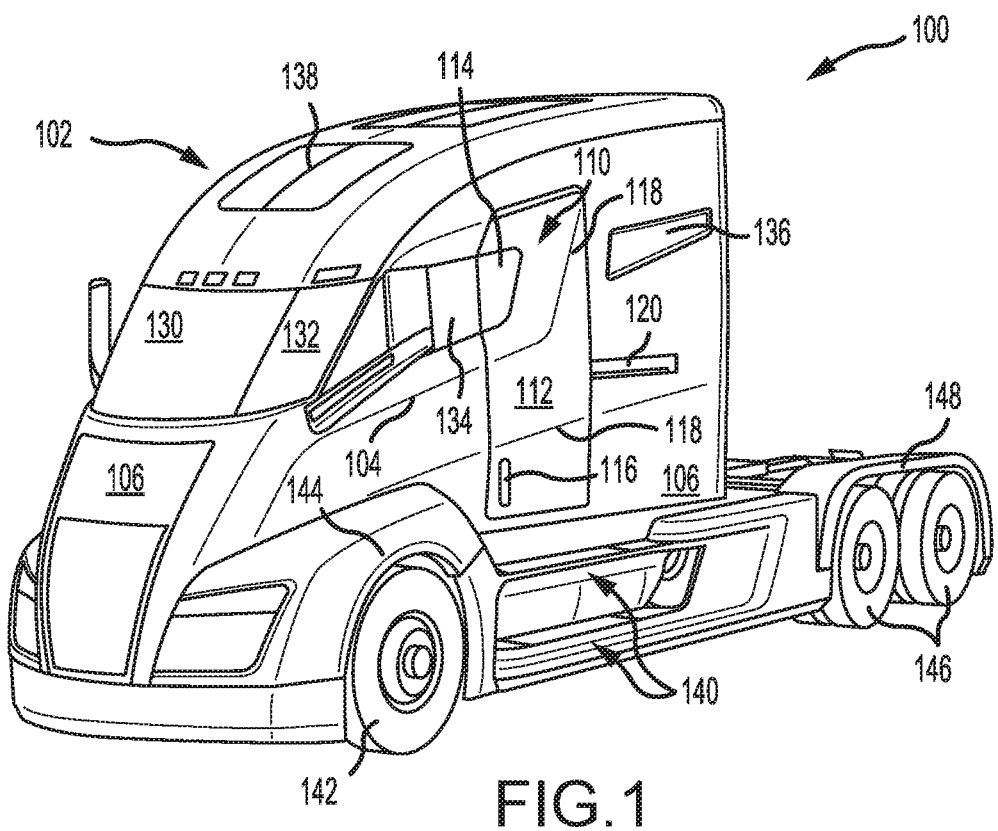
FIG. 1 is a front perspective view of a vehicle in accordance with the present disclosure.

The disclosure relates generally to outer bodies of semi-trucks that provide improved aerodynamics and/or reduced coefficients of drag. Disclosed herein are outer bodies for trucks having improved aerodynamic characteristics that reduce drag generated at operational speeds.

In an embodiment, a truck is disclosed that provides improved aerodynamics. The truck includes an outer body. The outer body may include a nose section that has an upper portion and a lower portion. In various embodiments, the truck has a drag coefficient that is between 0.42 and 0.48. In other embodiments, the truck has a drag coefficient that is between 0.36 and 0.40.

In an embodiment, an outer body for a truck having a nose section having a lower portion and an upper portion is disclosed. The lower portion has a first slope and the upper portion has a second slope. The second slope of the upper portion is less than the first slope of the lower portion. The first slope and the second slope can, for example, provide improved aerodynamic performance for the outer body of the truck by providing improved airflow over the outer body.

In an embodiment, a nose section of a truck is disclosed, where the lower portion may have a slope angle of about 2.7° and the upper portion may have a slope angle of about 29.4° in a plane that bisects a width of the truck along its longitudinal length and that is orthogonal to the ground. The slope angles of the lower portion and the upper portion create an improved aerodynamic flow over the tractor unit that reduce drag while the tractor unit is in motion.

In an embodiment, an outer body for a truck that has electric drive motors is disclosed. The truck may have an electric motor for each wheel or pair of wheels. The truck may have six electric motors and a bank of batteries for providing power for the six electric motors. The outer body may, for example, provide improved aerodynamic performance. The outer body may have a coefficient of drag of less than 0.5.

In an embodiment, an outer body for a truck that provides improved aerodynamics is disclosed. The outer body may include a nose section having a first slope angle and a second slope angle. Further, the driver and passenger sides of the outer body may include a taper, such as, for example, symmetrical tapers on both the driver and passenger sides. The roof of the outer body may include an air scoop to channel a cooling air stream over electronic components located behind the cabin of the tractor unit.

For purposes of promoting an understanding of the principles in accordance with the disclosure, reference will now be made to the embodiments illustrated in the drawings and specific language will be used to describe the same. It will nevertheless be understood that no limitation of the scope of the disclosure is thereby intended. Any alterations and further modifications of the inventive features illustrated herein, and any additional applications of the principles of the disclosure as illustrated herein, which would normally occur to one skilled in the relevant art and having possession of the disclosure, are to be considered within the scope of the disclosure.

It is to be understood that this disclosure is not limited to the particular configurations, process steps, and materials disclosed herein as such configurations, process steps, and materials may vary. It is also to be understood that the terminology employed herein is used for the purpose of describing particular embodiments only and is not intended to be limiting.

In describing the disclosure, the following terminology will be used in accordance with the definitions set out below.

It must be noted that, as used in this specification and the appended claims, the singular forms "a," "an," and "the" include plural referents unless the context clearly dictates otherwise.

As used herein, the terms "comprising," "including," "containing," "characterized by," and grammatical equivalents thereof are inclusive or open-ended terms that do not exclude additional, unrecited elements or method steps.

With reference to FIG. 1, in various embodiments, a vehicle 100 is an electric driven semi-truck having a vehicle body 102, a plurality of front wheels 142, a plurality of front wheel wells 144, a plurality of rear wheels 146, a plurality of rear wheel wells 148, and an electric motor and associated gear train at each front wheel 142. For example, vehicle 100 can comprise a sleeper cab configuration.

In various embodiments, the vehicle 100 includes an aerodynamic door 110 that includes an integrated door window 114 and a door handle 116. The door 110 includes an aerodynamic curvature 118 on the exterior door surface 112 that matches the curvature 104 of the vehicle 100. The vehicle body 102 includes an aerodynamic front windshield 130 and panoramic windows 132 on either side of the front windshield 130. The vehicle body 102 includes at least one side window 134 on either side of the vehicle body 102, wherein an operator or passenger of the vehicle may open or close the side window 134. In an embodiment, a side window 134 connects and aligns with an integrated door window 114 when the door 110 is closed. The vehicle body 102 includes a cabin window 136 located in a rear portion of the vehicle body 102 with respect to the front windshield 130. The vehicle body 102 includes a sunroof 138 (or moon roof 138) integrated into the roof of the vehicle body 102. The vehicle body 102 further includes at least one step 140 mounted to the exterior of the vehicle body 102. The step 140 is located such that a user may ascend or descend the at least one step 140 when entering or exiting the vehicle through the door 110.

Vehicle 100 can, for example, include an electric motor and associated gear train (e.g., gear train with dual gear reduction) at every wheel 142, 146, and the motors and gear trains may be grouped in pairs to form a motor gearbox assembly. In the embodiment illustrated in FIG. 1, the four rear wheels 146 each include a dual wheel pair (two wheels that rotate together). The electric motor may be configured to produce any suitable horsepower (HP), such as 100 to 400 HP, with six motors combined, may output about 2,000 HP and over 3,700 ft. lbs. of torque before gear reduction, and nearly 86,000 ft. lbs. of instant torque after gear reduction. The electric motors of the vehicle may produce superior horsepower, torque, acceleration, pulling and stopping power over other class 8 semi-trucks known in the art. It should be noted that the inclusion of an electric motor, and the elimination of a standard combustion engine, may allow for the reconfiguration of the layout and structure of a standard semi-truck as known in the art. The reconfiguration of many components of the vehicle body 102 can be advantageous to a user, as disclosed and described in the present application. The elimination of the combustion engine has, for example, provided for the at least one seat to be located at a position nearer the front of the vehicle body 102 than in a conventional semi-truck.

The aerodynamic door 110 is located to improve access and/or safety when entering or exiting the vehicle. In an embodiment, the door 110 is a sliding door as illustrated in FIG. 1, and in a further embodiment, the door 110 is a hinged door. In an embodiment, the door 110 is located directly above a portion of the at least one step 140 such that a user may comfortably ascend or descend the step 140 when entering or exiting the vehicle through the door 110. The door 110 is located to a backside of the at least one front wheel 142 and front wheel well 144. In an embodiment, the step 140 is connected to the front wheel well 144 and the door 110 is positioned immediately above the step 140 as illustrated in FIG. 1.

Figure 5:
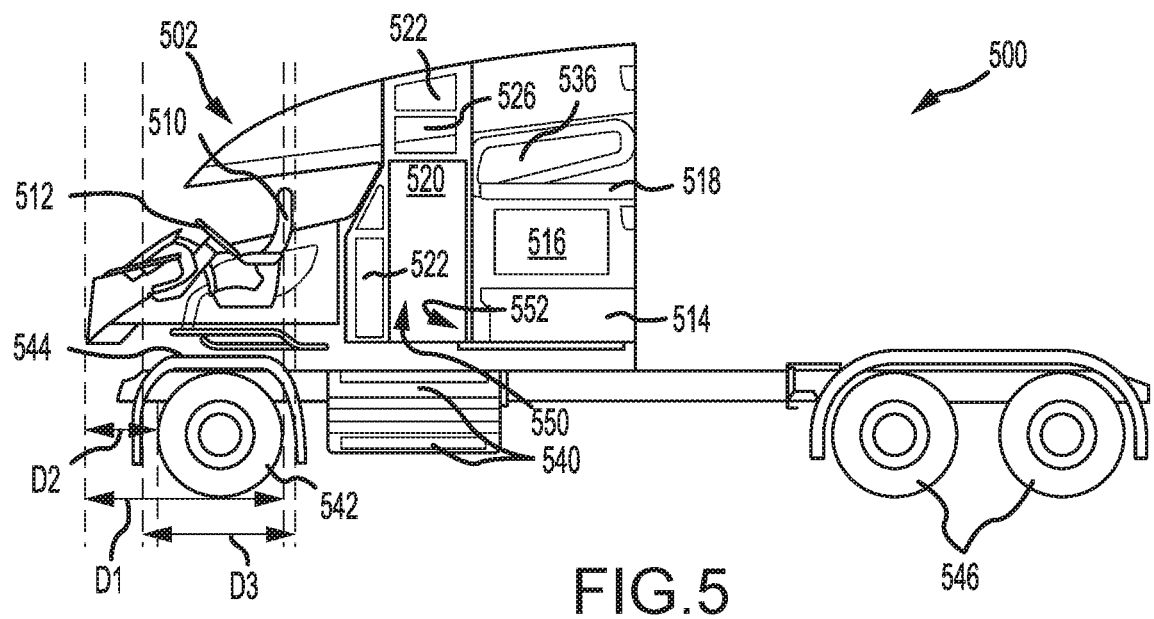
FIG. 5 is a side view of a vehicle showing interior components of the vehicle in accordance with the present disclosure.

The door 110 permits ingress and egress into the vehicle body 102 and the door 110 opens to a backside of at least one seat (see 510 in FIG. 5) in the interior cabin (see 550 in FIG. 5). In an embodiment, there is no additional door that provides immediate access to a seat. Stated another way, door 110 can comprise the foremost door providing ingress and egress into the vehicle body 102. In an embodiment, the door 110 provides ingress and egress from a backside of a seat and there is no other door on that side of the vehicle body 102. In various embodiments, the vehicle body 102 includes a single door at a driver's side of the vehicle or at a passenger's side of the vehicle. The vehicle body 102 can include, for example, two doors, wherein one door is located at a driver's side of the vehicle and an additional door is located at a passenger's side of the vehicle. In at least one embodiment, more than one door may be located on each side of the vehicle.

In various embodiments, the door 110 extends from a top of the step 140 to the top or roof of the vehicle body 102. In an embodiment, the door 110 provides an opening that is at least seven feet high. In an embodiment, the door 110 provides an opening that is at least six feet six inches high. In an embodiment, the door 110 provides an opening that is at least six feet high. In an embodiment, the door 110 provides an opening that is at least five feet high. In an embodiment, the door 110 is configured to permit at least one person to stand in the door frame without bending or crouching when the door 110 is opened.

A portion of the door 110 is located above the front wheel well 144. In an embodiment, a front side of the door 110 is located at least six inches behind a backside of the front wheel well 144. In an embodiment, a front side of the door 110 is located at least twelve inches behind a backside of the front wheel well 144. In an embodiment, a front side of the door 110 is located at least eighteen inches behind a backside of the front wheel well 144. The width of the door 110 is configured to permit at least one person to stand in the doorframe while facing into the vehicle body 102 when the door 110 is opened. In an embodiment, the door 110 is at least two feet wide. In an embodiment, the door 110 is at least three feet wide. In an embodiment, the door 110 is at least four feet wide. In an embodiment, the door 110 is configured to permit at least one person to stand in the doorframe while holding a standard sized piece of luggage and facing into the vehicle body 102 when the door 110 is opened.

In an embodiment of the present disclosure, the door opens to a landing (see 252 in FIG. 2 and/or 552 in FIG. 5) and a person may comfortably step into the vehicle body 102 while facing forward into the vehicle body 102. It should be noted that prior art vehicle doors are typically configured to provide immediate access to a vehicle seat and therefore require a user to enter the door at an angle. This can be particularly dangerous in the case of a semi-truck, wherein the door and the seat may be located at a significant distance above the ground and the vehicle body may be very large. Particularly in the case of semi-trucks, a user may have difficulty entering or exiting the semi-truck, and the user is at risk of injury while entering or exiting the semi-truck, when the user must slide into or out of a seat of the vehicle while ascending or descending a step on the exterior of the vehicle. It is therefore beneficial to provide a vehicle door, and particularly a semi-truck door, that permits a user to enter the vehicle without immediately sitting in a seat. In one embodiment, a width of the door is completely unobstructed by a seat or seat cushion. In one embodiment, a majority of the width of the door, such as at least 50% of the width of the door, is unobstructed by a seat or seat cushion. In one embodiment, a width of the door is completely unobstructed by a front edge of a seat. For example, a rear or back of a seat may slightly or partially obstruct the opening but a front or seat portion of the seat may not obstruct the opening. Eliminating or minimizing the amount of door opening that is obscured by a seat may allow a user to more easily enter or exit by walking into the vehicle 100 while keeping their body square or parallel with the opening. A seat or other object may be considered obscuring the opening if it is within three feet, two feet, one foot, or less of the opening of the door 110. In an embodiment, other objects such as tables, cabinets, or other structures may also not obscure the opening.

In an embodiment of the present disclosure, the size and shape of the door 110 is configured to permit a person to comfortably step into the vehicle body 102 as if stepping through a residential door. In an embodiment of the present disclosure, the door 110 is configured to permit a person to safely face into the vehicle body 102 when entering or exiting the vehicle body 102. The base of the door 110 may be located at a significant distance above the ground and it is beneficial to provide an ingress and egress of the vehicle body 102 that permits a person to comfortably and safely step into the vehicle body 102.

The door handle 116 is located on the door 110 to improve access and safety when engaging the door handle 116 to unlock and/or open the door 110. The door handle 116 may include any handle known in the art or later developed, including, for example, a lever type, a push button type, a lift back type, a pull type, or any other type of door handle 116. In an embodiment, the door 110 is a sliding door and the handle 116 is located at a portion of the door 110 nearest the front windshield 130 of the vehicle 100. In an embodiment, the door 110 is a sliding door and the handle 116 engages a drive motor to pull the door 110 open or closed when the handle 116 is engaged by a user. In one embodiment, the handle 116 is located in a bottom half, bottom third, and/or bottom quarter of the door 110.

The door curvature 118 is designed to increase the aerodynamic nature of the vehicle 100 and to decrease drag when the vehicle 100 is in motion. The door curvature 118 matches an overall curvature 104 of the vehicle 100 such that the door 110 is fully integrated into the exterior of the vehicle 100 when the door 110 is closed.

In the case of a sliding door 110, the sliding door track 120 connects with the door 110 and provides a path for the door 110 to slide when opening or closing. In an embodiment, the vehicle 100 includes an upper door track, a mid-track, and a lower door track. In an embodiment, the vehicle 100 includes a single sliding door track 120. The sliding door track 120 is configured to permit the door to be smoothly opened without applying a significant amount of pressure.

The at least one exterior step 140 is mounted to or located on the exterior of the vehicle 100. The step 140 is constructed of any suitably rigid material and is configured to support the weight of at least one person. The at least one step 140 is located at the door 110 such that a user may ascend the step 140 and pass through the door 110 when opened. In an embodiment, the step 140 is a standard full-size step. In an embodiment, the at least one step 140 is fully rigid and cannot be collapsed. In an embodiment, the at least one step 140 includes joints and can be collapsed when not in use. In an embodiment, the vehicle body 102 includes a handle or similar point of leverage that is configured to provide stability to a user when the user is ascending the at least one step 140 or entering the vehicle 100 through the door 110. In an embodiment, the vehicle body 102 includes two handles configured to provide two points of leverage and assist a user when ascending the at least one step 140 or entering the vehicle 100 through the door 110. In such an embodiment, the user may ascend the at least one step 140, hold on to one or more of the handles, and pass through the door 110 facing forward into the cabin interior.

The aerodynamic vehicle body 102 is configured and formed to reduce drag when the vehicle 100 is in motion. In an embodiment, the vehicle 100 is an electric powered semi-truck and the vehicle does not include a combustion engine at the front side of the vehicle. Therefore, because the vehicle 100 does not include a combustion engine, the vehicle body 102 may have a particularly aerodynamic shape. In an embodiment, a seat (see 510 in FIG. 5) is located above a front wheel well 144. In an embodiment, the front windshield 130 is located near the front-most point of the vehicle 100 and the front windshield 130 and panoramic windows 132 are configured to provide a user with a wide range of visibility. It should be appreciated that locating a seat 510 near the front of the vehicle body 102 and providing a panoramic view of the surroundings will increase safety and visibility when operating the vehicle 100.

Figure 2:
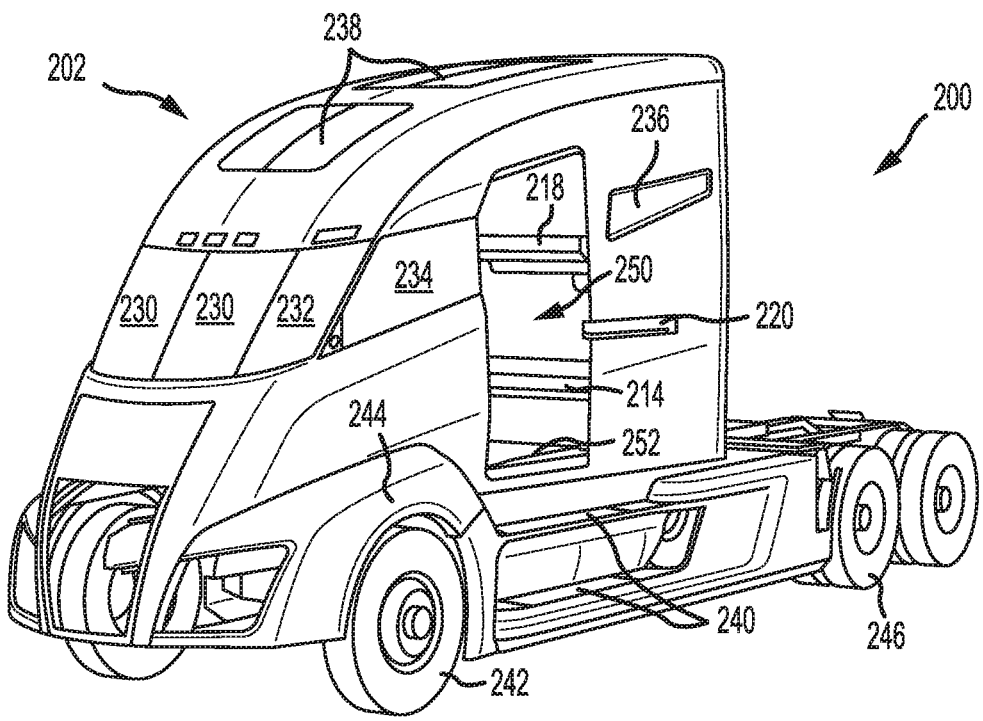
FIG. 2 is a front perspective view of a vehicle with a door removed in accordance with the present disclosure.

With reference to FIG. 2, a front perspective view of a vehicle 200 without a door is illustrated. The vehicle 200 includes a vehicle body 202 having a front windshield 230, a panoramic window 232, at least one side window 234, a cabin window 236, and a sunroof or moon roof 238. The vehicle 200 includes a plurality of front wheels 242 and front wheel wells 244 and a plurality of rear wheels 246. The vehicle 200 includes at least one exterior step 240 leading to a door (see 110 in FIG. 1). In an embodiment, the door is a sliding door that is operated by sliding the door along a track 220 integrated into the exterior of the vehicle 200. The vehicle 200 includes a cabin interior 250 and a landing 252 within the cabin interior 250. The cabin interior 250 includes a sleeper area having a lower sleeping space 214 and an upper sleeping space 218. FIG. 2 illustrates the vehicle 200 without a door (see 110 in FIG. 1) such that a portion of the interior cabin 250 may be shown.

In an embodiment, the landing 252 is an open space and it includes a flat horizontal landing 252. Where the front windshield 230 denotes the front of the vehicle 200, the landing 252 is located at a backside of a seat (see 510 in FIG. 5). In an embodiment, the landing 252 is located behind a front wheel well 244. In an embodiment, the landing 252 is located in front of a sleeping space 214, 218. In an embodiment, the landing 252 extends from the door opening to a wall directly opposite the door opening. In an embodiment, the vehicle body 202 includes two doors 110 directly opposite from one another, and the landing 252 extends from one door opening to the other door opening.

In an embodiment, the size and shape of the landing 252 is configured to accommodate at least one person. In an embodiment, the landing 252 has a vertical ceiling height that is configured to accommodate a person without the need for the person to bend over. In an embodiment, the landing 252 has a vertical ceiling height of at least eight feet. In an embodiment, the landing 252 has a vertical ceiling height of at least seven feet. In an embodiment, the landing 252 has a vertical ceiling height of at least six feet six inches. In an embodiment, the landing 252 has a vertical ceiling height of at least six feet. In an embodiment, the landing 252 has a vertical ceiling height of at least five feet six inches.

Figure 3:
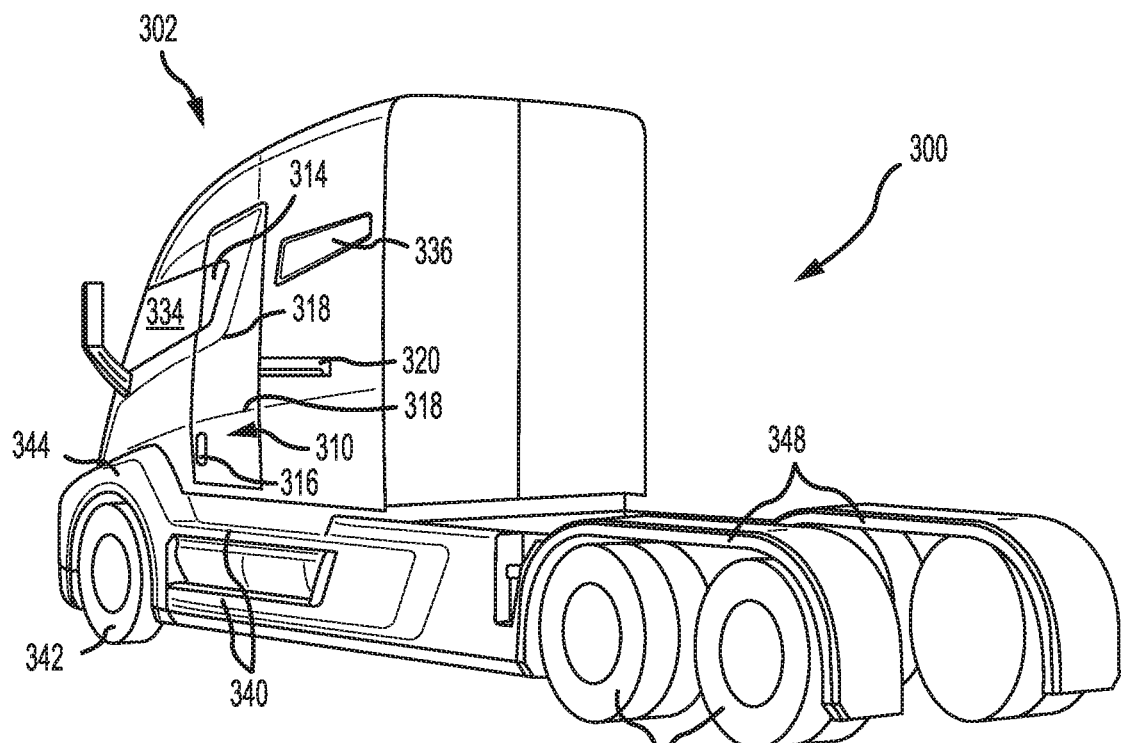
FIG. 3 is a rear perspective view of a vehicle in accordance with the present disclosure.

Referring now to FIG. 3, a rear perspective view of a vehicle 300 made in accordance with the teachings and principles of the disclosure is illustrated. The vehicle 300 includes a vehicle body 302 having at least one side window 334 and at least one cabin window 336. The vehicle 300 includes a plurality of front wheels 342 and front wheel wells 344 and a plurality of rear wheels 346 and rear wheel wells 348. The vehicle 300 includes at least one step 340 leading to a vehicle door 310. The door 310 includes a handle 316, an aerodynamic door curvature 318, and an integrated door window 314. In an embodiment, the door 310 is a sliding door and it is opened and closed by sliding on a track 320.

Figure 4:
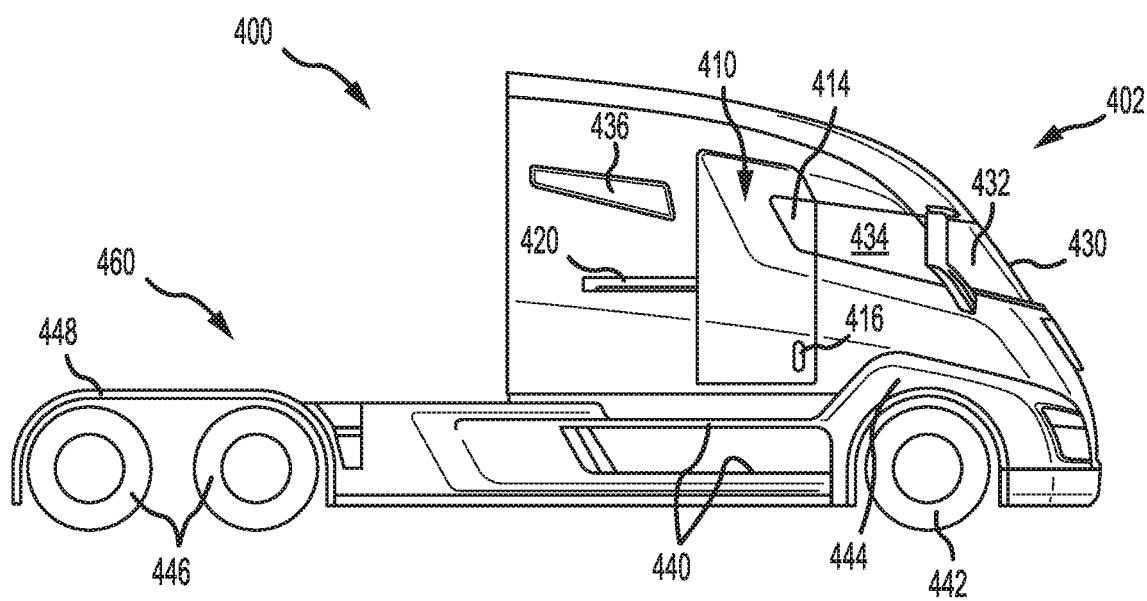
FIG. 4 is a side view of a vehicle in accordance with the present disclosure.

Referring now to FIG. 4, a side view of a vehicle 400 made in accordance with the teachings and principles of the disclosure is illustrated. In an embodiment, the vehicle 400 is a semi-truck with a vehicle body 402. The vehicle 400 includes a plurality of front wheels 442, front wheel wells 444, rear wheels 446, and rear wheel wells 448. The vehicle body 402 includes a front windshield 430, a panoramic window 432, at least one side window 434 and a cabin window 436. The vehicle body 402 includes a vehicle door 410 having a handle 416 and an integrated door window 414. In an embodiment, the door 410 is a sliding door and the vehicle body 402 includes a sliding door track 420. The vehicle body 402 includes at least one step 440 located at the base of the door 410 that may permit a user to access the door 410 and comfortably enter or exit the vehicle body 402.

Referring now to FIG. 5, a side view of a vehicle 500 showing interior components of the vehicle 500 is shown. As illustrated in FIG. 5, the vehicle 500 is a semi-truck having a vehicle body 502. The vehicle 500 includes a plurality of front wheels 542 and a plurality of rear wheels 546. The vehicle 500 includes at least one seat 510 in which a driver or a passenger may sit. In an embodiment, the vehicle body 502 includes only a driver seat 510 and in a further embodiment the vehicle body 502 includes a driver seat 510 and a passenger seat. The vehicle body 502 includes a steering wheel 512 positioned in front of a driver seat 510.

The vehicle includes at least one step 540 mounted to the exterior of the vehicle body 502. A user may ascend or descend the at least one step 540 when entering or exiting the vehicle body 502 through the door (see 110 in FIG. 1). The vehicle body 502 includes a cabin interior 550 having a landing 552. FIG. 5 further illustrates distance markings D1 and D2 that are further disclosed and discussed with respect to FIG. 7. D1 illustrates a distance from a front end of the vehicle body 502 to a rear most location on the front wheels 542. D2 illustrates a distance from a front end of the vehicle body 502 to a front most location on the front wheels 542. The first distance D1 is greater than the second distance D2. D3 illustrates a distance or horizontal distance between a front most portion and a rear most portion of the front wheel well 544. In an embodiment, the entirety of the at least one seat 510 is located within the horizontal distance D3 of the front wheel wells 544.

The vehicle cabin interior 550 includes a number of features to provide comfort and convenience to an operator or passenger of the vehicle 500. In an embodiment, the cabin interior 550 includes a cooling appliance 520 and a microwave oven 526 or other small appliance. The cabin interior 550 includes a plurality of storage spaces 522. The cabin interior 550 includes a lower sleeping space 514 and an upper sleeping space 518. The cabin interior 550 includes a display 516 such as a television, monitor, touch screen monitor, computer, and/or the like. The cabin interior 550 includes at least one cabin window 536.

The cooling appliance 520 includes any of a powered refrigerator, a powered freezer, a powered refrigerator and freezer combination, or a non-powered version of any of the aforementioned cooling appliances. In an embodiment, the cooling appliance 520 is located opposite the door (see 110 in FIG. 1). The cooling appliance 520 may be mounted to a wall of the vehicle body 502, and/or it may be mounted to the landing 552, or it may be freestanding. In an embodiment, the cooling appliance 520 is powered by the ESS of the vehicle 500. In an embodiment, the cooling appliance 520 includes an internal volume of at least five cubic feet, or of at least ten cubic feet, or further, of at least fifteen cubic feet, or yet further, of at least twenty cubic feet.

In an embodiment, the microwave oven 526 is located opposite the door (see 110 in FIG. 1) and mounted above the cooling appliance 520. It should be appreciated that the microwave oven 526 may be replaced with any other suitable appliance or may be replaced with a storage space without departing from the spirit and scope of the disclosure. In an embodiment, the microwave oven 526 is powered by the ESS of the vehicle 500.

In an embodiment, one or more storage spaces 522 are built in to the cabin interior 550. It should be appreciated that the cabin interior 550 may include a storage space 522 located in any suitable place. A storage space 522 may be located, for example, underneath the lower sleeping space 514 or above the upper sleeping space 518, underneath the landing 552 flooring, on a backside of a seat 510, above the microwave oven 526, to the side of the cooling appliance 520, or in any other suitable location.

In an embodiment, the display 516 is mounted to a wall of the cabin interior 550 opposite the door (see 110 in FIG. 1) and between the lower sleeping space 514 and the upper sleeping space 518. The display 516 may include any display known in the art or later discovered such as, for example, a light-emitting diode display, an electroluminescent display, an electronic paper display, a plasma display panel, a liquid crystal display, an organic light-emitting diode display, and the like. The display 516 may include a television, a computer monitor, a touchscreen display, or any other suitable display. The display 516 may be in electronic communication with a network interface, a computing device, or any other suitable appliance. In an embodiment, the display 516 is powered by the ESS of the vehicle 500.

In an embodiment, the lower sleeping space 514 and the upper sleeping space 518 are located farther from the front of the vehicle (see 130 in FIG. 1) than the door (see 110 in FIG. 1). That is, the lower sleeping space 514 and the upper sleeping space 518 are located at the backside portion of the cabin interior 550. Each of the sleeping spaces 514, 518 may be mounted to at least one wall of the vehicle 500 and the sleeping spaces 514, 518 may be hinged on one side such that the sleeping space 514, 518 may be hinged and stored away when not in use. Each of the sleeping spaces 514, 518 are accessible from the landing 552. In an embodiment, each of the sleeping spaces 514, 518 includes a mattress. In an embodiment, at least one of the sleeping spaces 514, 518 includes a standard sized mattress in a twin size, a full size, or a queen size. In an embodiment, at least one of the sleeping spaces 514, 518 includes a non-standard size mattress.

Figure 6:
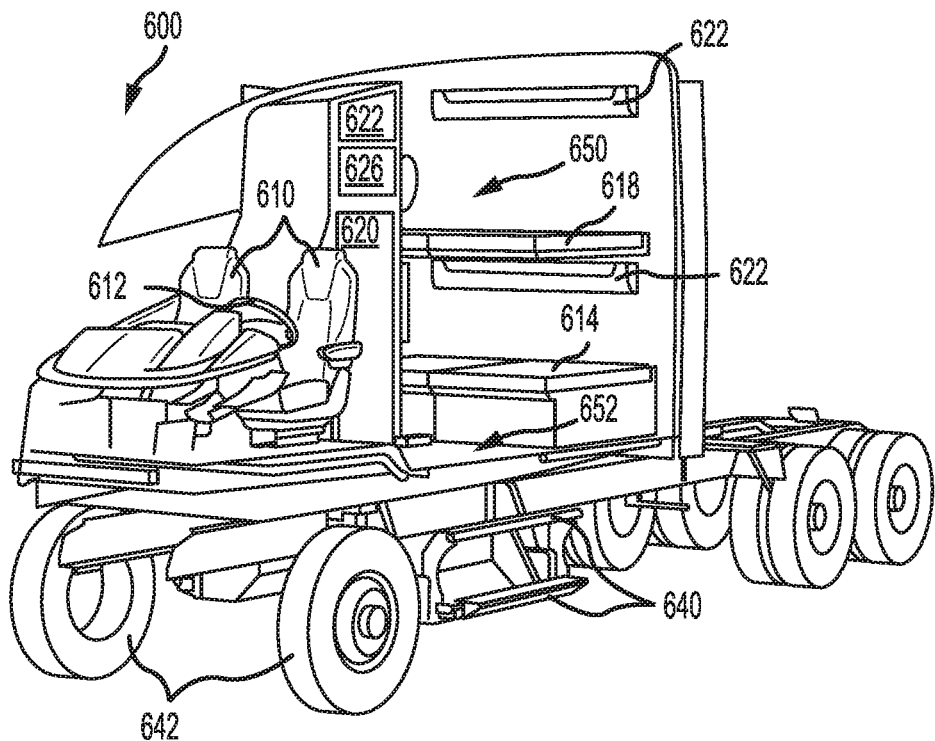
FIG. 6 is a front perspective view of a vehicle showing interior components of the vehicle in accordance with the present disclosure.

Referring now to FIG. 6, a front perspective view of a vehicle 600 illustrating interior components of the vehicle 600 is shown. The vehicle 600 includes at least one seat 610 and a steering wheel 612. The vehicle 600 includes a cabin interior 650. The cabin interior 650 includes a cooling appliance 620, a microwave oven 626 or other small appliance, and a plurality of storage spaces 622. The cabin interior 650 includes a lower sleeping space 614 and an upper sleeping space 618 that form a sleeper in the cabin interior 650. The vehicle 600 includes front wheels 642. The vehicle 600 includes at least one step 640 mounted to the exterior of the vehicle 600, wherein the at least one step 640 permits a user to safely enter or exit the vehicle 600 through a door (see 110 in FIG. 1). The cabin interior 650 includes a landing 652 adjacent to the door 110 that is configured to accommodate at least one person.

A person may access either of the lower sleeping space 614 or the upper sleeping space 618 from the landing 652. A person may comfortably access and open either of the cooling appliance 620 and the microwave oven 626 while standing at the landing 652. A person may access the at least one seat 610 from the landing 652. In an embodiment, as illustrated in FIG. 6, the vehicle 600 includes two seats 610 and a user may access either of the two seats from the landing 652 by passing between the two seats 610.

Figure 7:
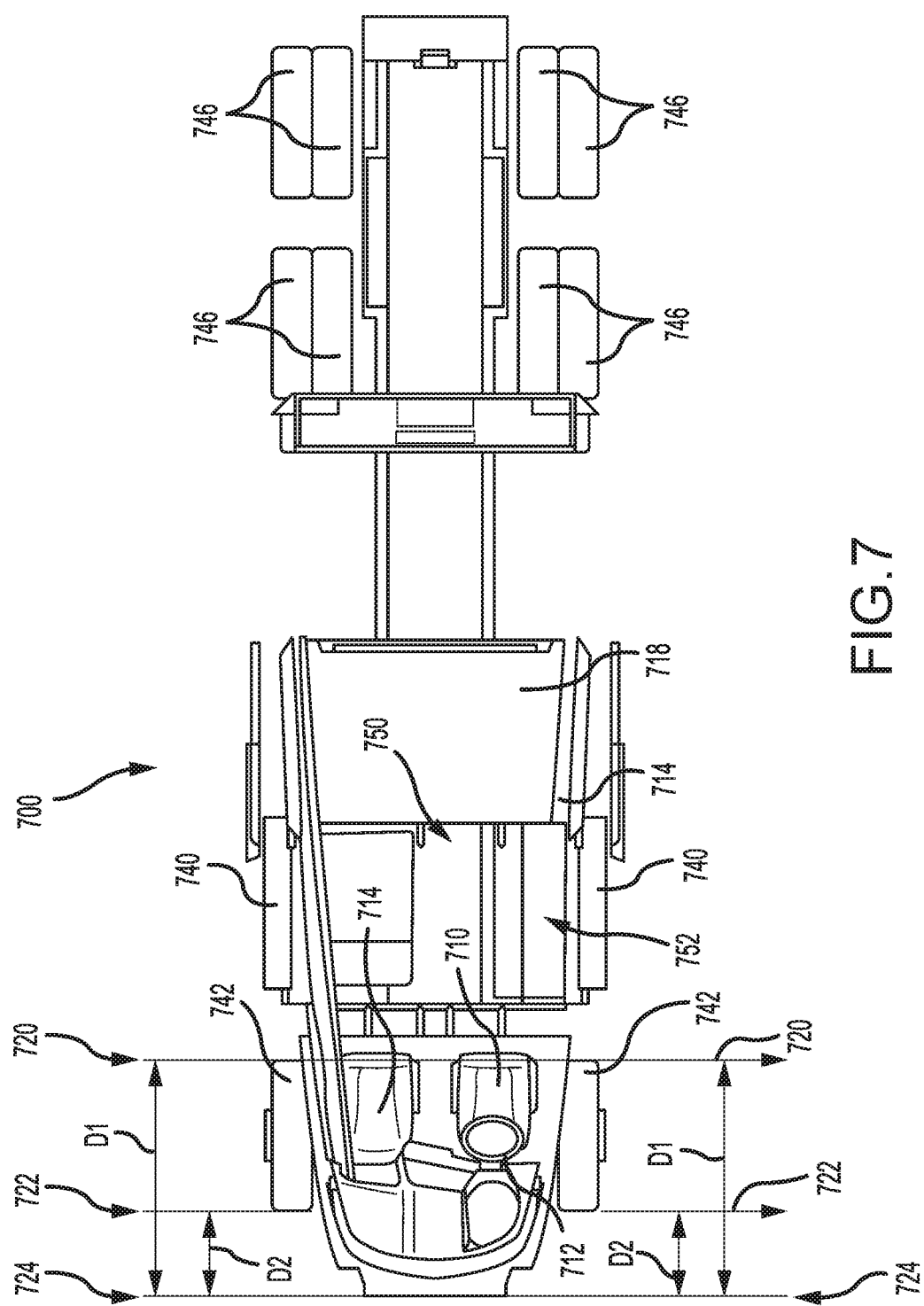
FIG. 7 is a top view of a vehicle showing interior components of the vehicle in accordance with the present disclosure.
Figure 8A:
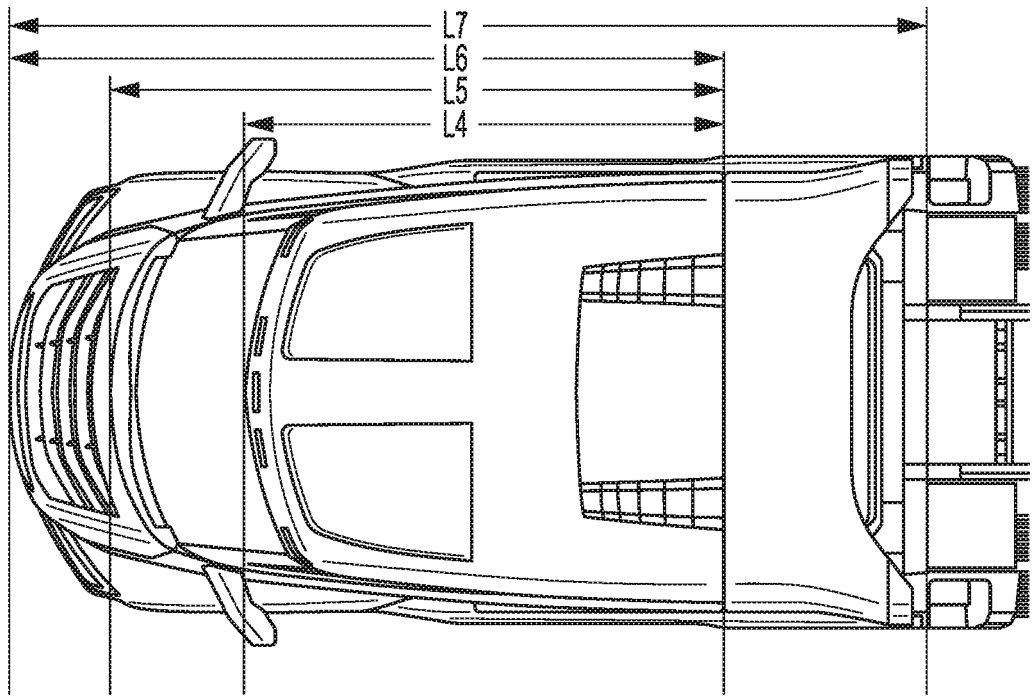
FIG. 8A is a top view of a vehicle in accordance with the present disclosure with various dimensions indicated.
Figure 8B:
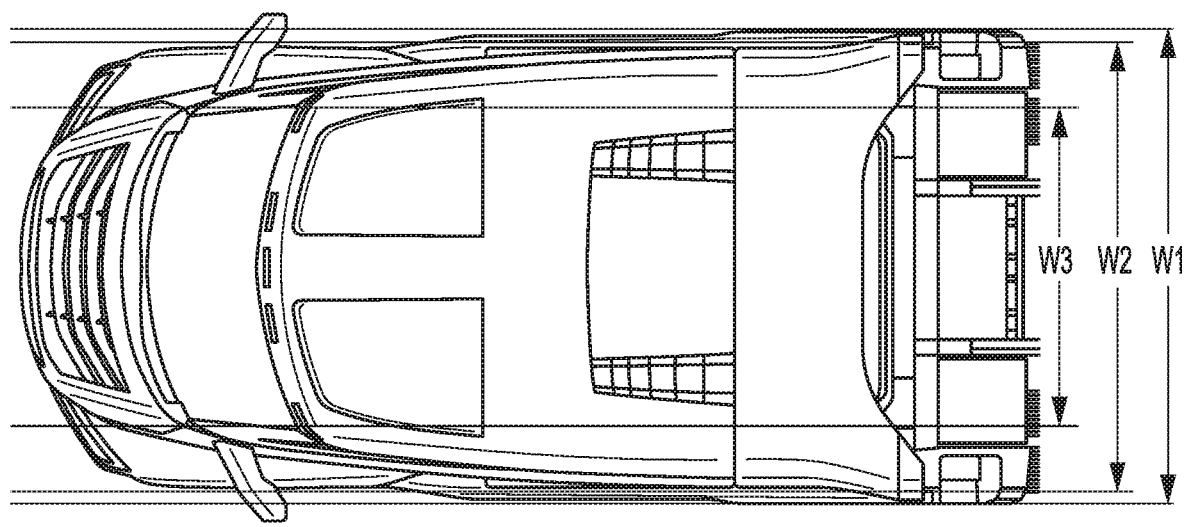
FIG. 8B is a top view of a vehicle in accordance with the present disclosure with various dimensions indicated.

Referring now to FIG. 7, an aerial view of a vehicle 700 showing interior components of the vehicle 700 is shown. The vehicle 700 includes a plurality of front wheels 742 and a plurality of rear wheels 746. The vehicle 700 includes at least one seat and may include a driver's side seat 710 and a passenger's side seat 714. The vehicle 700 includes a steering wheel 712 positioned in front of the driver's side seat 710. The vehicle 700 includes at least one step 740 mounted to the exterior of the vehicle 700. The at least one step 740 may provide access to a door (see 110 in FIG. 1) or it may not lead to a door. The vehicle 700 includes a cabin interior 750 having a landing 752 and a number of features to provide comfort and convenience to a user. The cabin interior 750 includes a sleeper including a lower sleeping space 714 and an upper sleeping space 718.

The vehicle 700 includes a front end 724. The front wheels 742 include a first rear most location 720 that is a first distance D1 from the front end 724. The front wheels 742 include a second front most location 722 that is a second distance D2 from the front end 724. The first distance D1 is greater than the second distance D2. As illustrated in FIG. 1, the majority of at least one of the seats 710, 714 is located within the first distance D1 of the front wheels 742. As discussed above, this placement of the at least one seat 710, 714 is made possible by the vehicle 700 being an electric powered vehicle 700 and not including a combustion engine. A typical semi-truck in the prior art having a combustion engine does not include space for at least one seat to be located in a position above a front wheel relative to the body of the vehicle. In an embodiment, the steering wheel 712, the at least one seat 710, 714, and the controls necessary for operating the vehicle are located in a position proximal to the front end 724 where a combustion engine would typically be located in a prior art combustion-based semi-truck. Because an embodiment of the present disclosure is an electric powered semi-truck without a combustion engine, the at least one seat 710, 714 can be located at a first distance D1 of the front wheels 742 relative to the front end 724.

In one embodiment, a foremost portion of a door is behind the first distance D1. For example, all portions of an opening revealed by a door may be greater than the first distance D1 from the front of the vehicle. Thus, the door may provide access to a cabin behind a seat, such as a driver's seat or driver compartment. In one embodiment, all portions of a driver's seat, when in a driving position, are within the first distance D1 of the front of the vehicle. In one embodiment, the foremost part of a door may be located further than the second distance D2 and/or first distance D1 from the front of the vehicle.

Figure 9A:
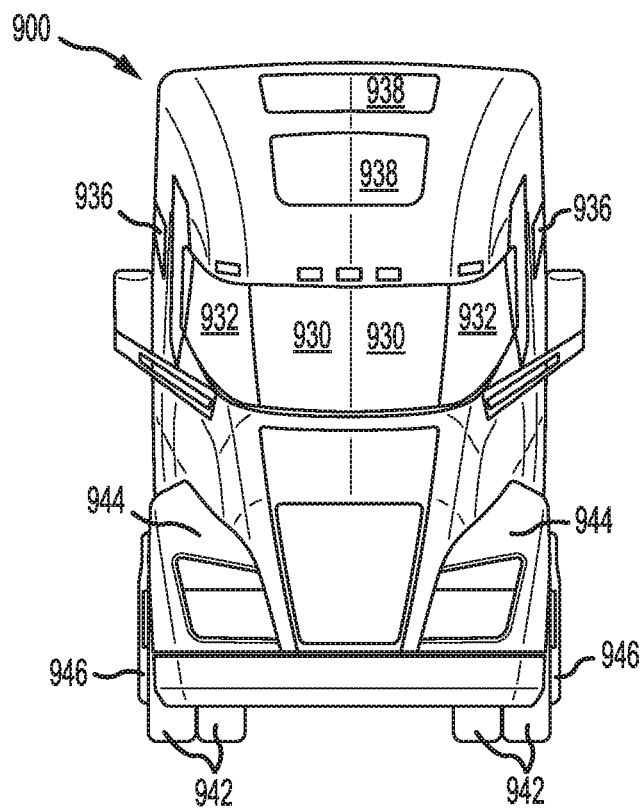
FIG. 9A is a front view of a vehicle in accordance with the present disclosure.
Figure 9B:
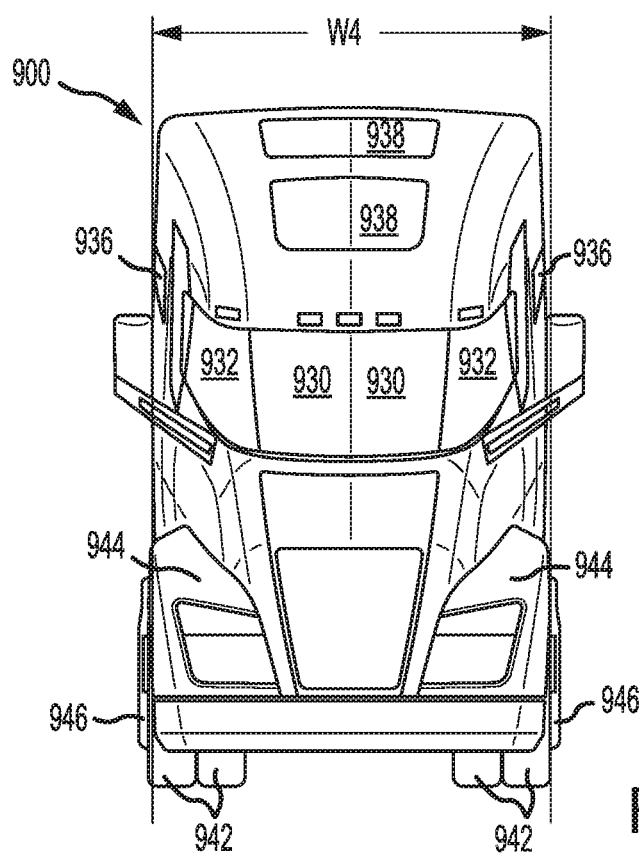
FIG. 9B is a front view of a vehicle in accordance with the present disclosure with various dimensions indicated.

Referring now to FIG. 9A, a front view of a vehicle 900 made in accordance with the principles and teachings of the disclosure is shown. The vehicle 900 includes a front windshield 930, at least one panoramic window 932, and at least one cabin window 936, and at least one roof window 938. The vehicle 900 includes a plurality of front wheels 942, a plurality of front wheel wells 944, and a plurality of rear wheels 946.

Figure 10A:
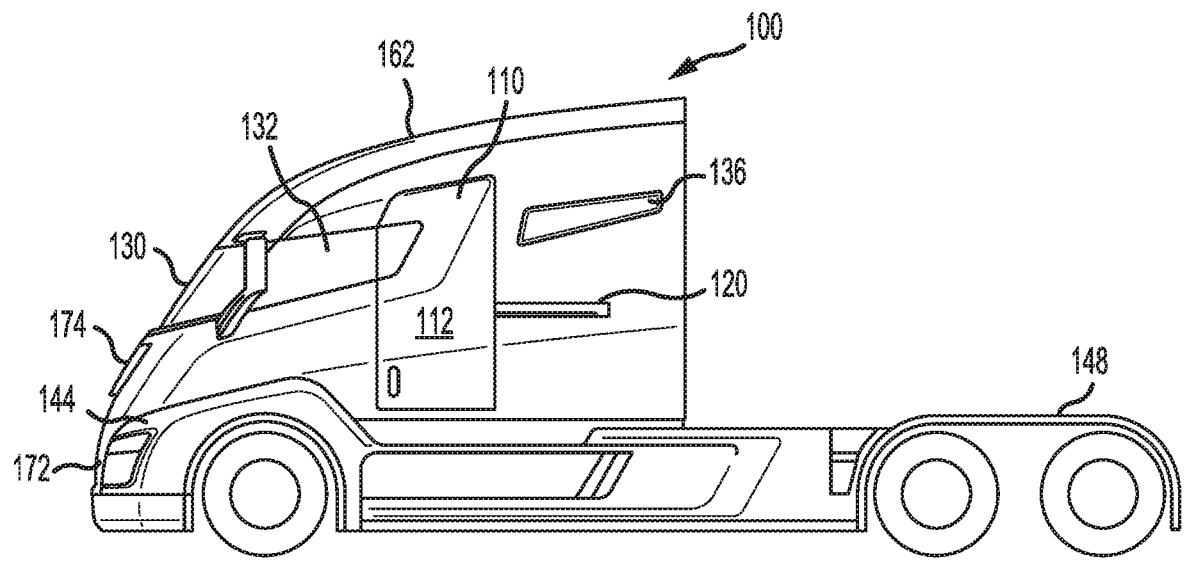
FIG. 10A is a side view of a vehicle in accordance with the present disclosure.
Figure 10B:
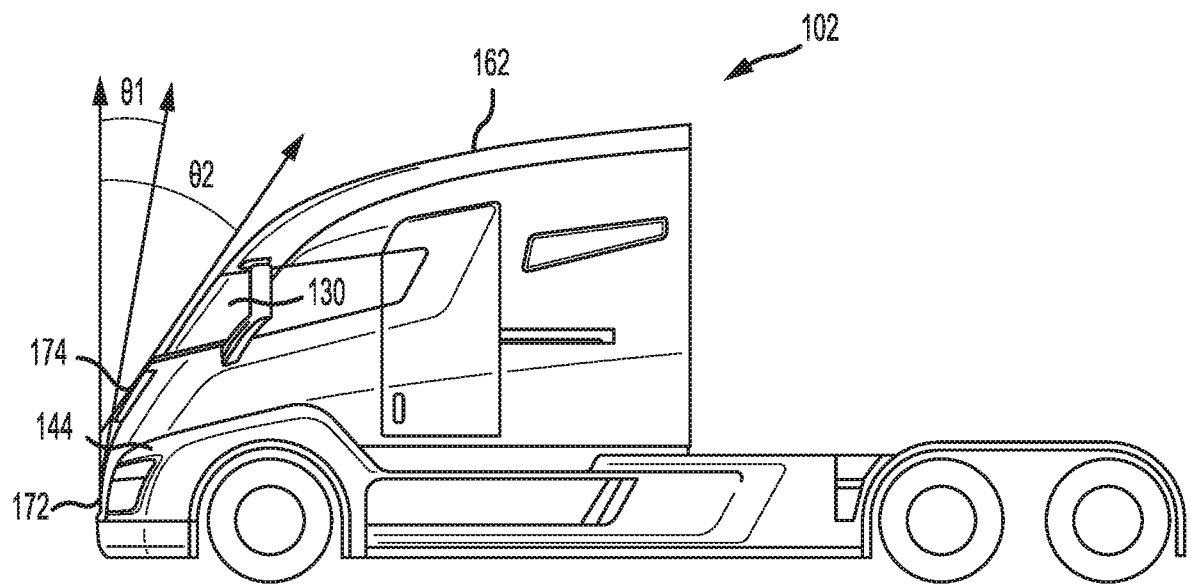
FIG. 10B is a side view of the vehicle of FIG. 10A with various angles indicated.

Referring to FIG. 10A, a side view of a vehicle 100 in accordance with the present disclosure is illustrated. Vehicle 100 comprises a front windshield 130, one or more panoramic windows 132, and one or more cabin windows 136. Further, vehicle 100 comprises a driver's side door 110.

Figure 11:
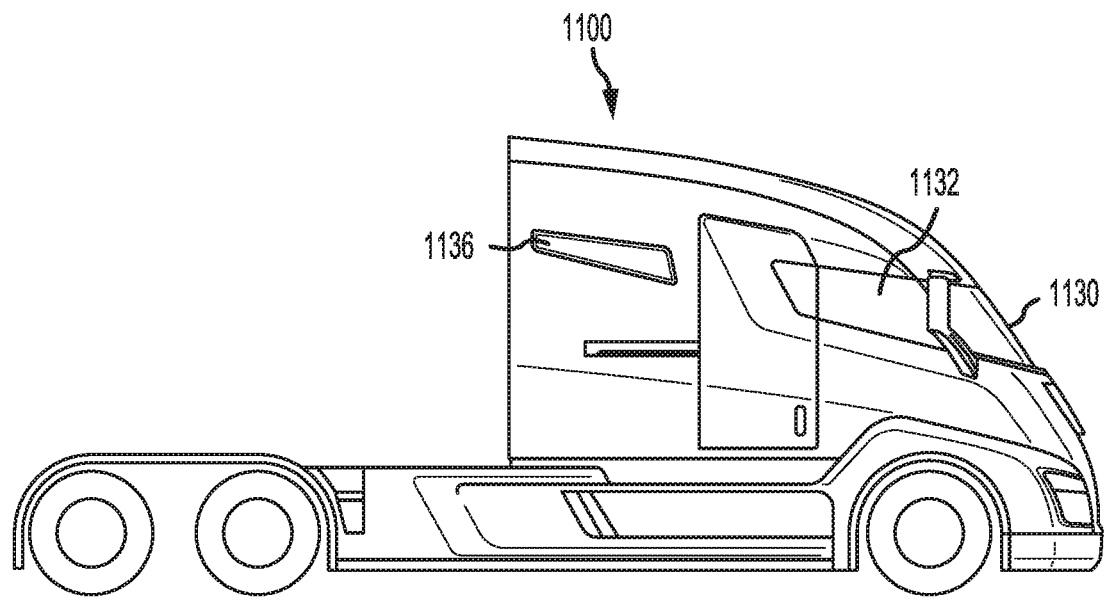
FIG. 11 is a side view of a vehicle in accordance with the present disclosure.

Referring to FIG. 11, a side view of a vehicle 1100 in accordance with the present disclosure is illustrated. Vehicle 1100 comprises a front windshield 1130, one or more panoramic windows 1132, and one or more cabin windows 1136. In various embodiments, vehicle 1100 does not comprise a passenger's side door.

Figure 12:
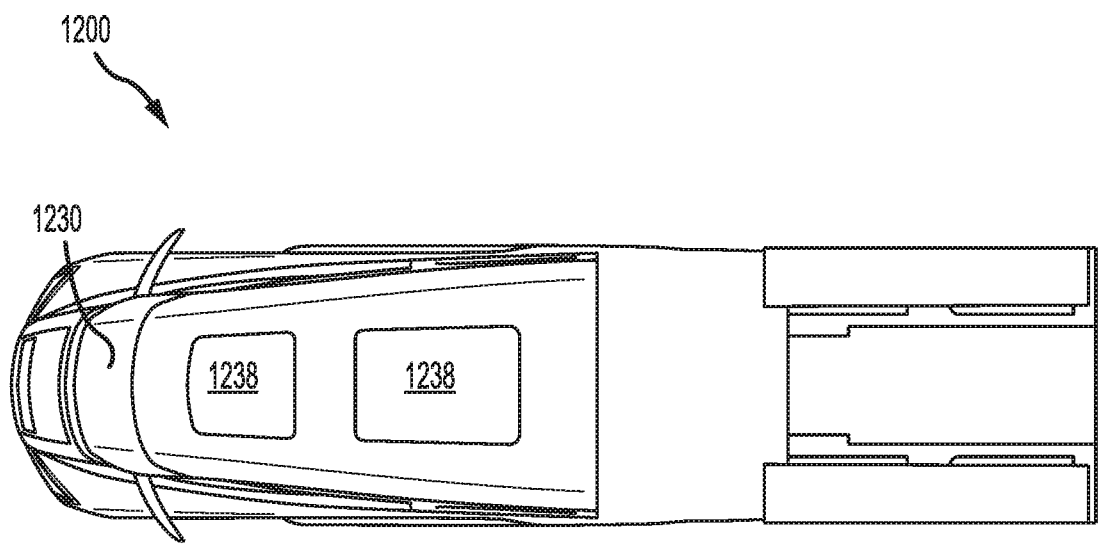
FIG. 12 is a top view of a vehicle in accordance with the present disclosure.

Referring to FIG. 12, a top view of a vehicle 1200 in accordance with the present disclosure is illustrated. Vehicle 1200 comprises a front windshield 1230, one or more panoramic windows 1232 (not shown on FIG. 12), and one or more cabin windows 1236 (not shown on FIG. 12). Further, vehicle 1200 comprises two roof windows 1238. In various embodiments, roof windows 1238 can be spaced apart from each other lengthwise along the roof.

Figure 13:
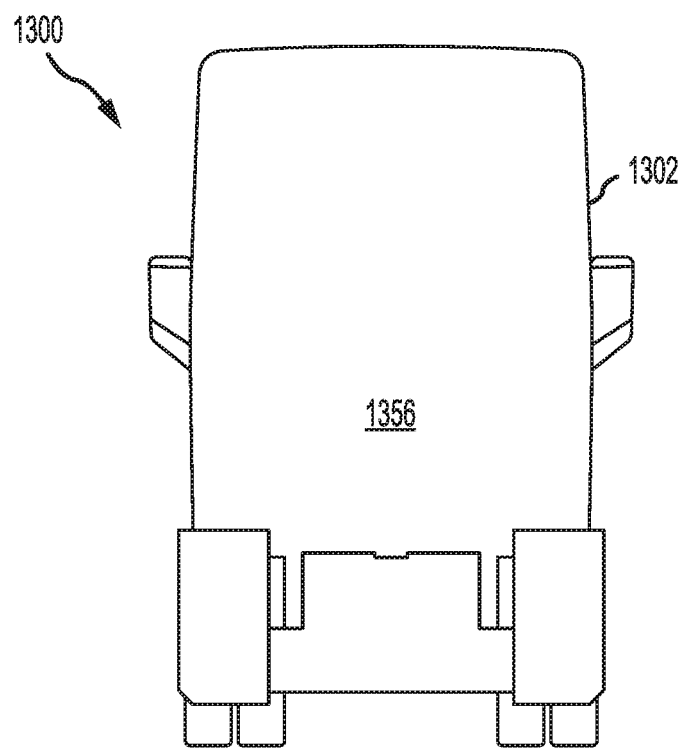
FIG. 13 is a rear view of a vehicle in accordance with the present disclosure.

Referring to FIG. 13, a rear view of a vehicle 1300 in accordance with the present disclosure is illustrated. Vehicle 1300 comprises a body 1302 having a rear wall 1356.

As illustrated in FIGS. 8B, 9B, and 10B-10E, various physical dimensions, including approximate lengths, widths, heights, and relative angles, of vehicle body 102 are summarized in the following Table 1.

TABLE 1

| Physical Dimensions and Angles of Vehicle 100 | | |
|---|---|---|
| Variable | Description | Value |
| Θ1 | Angle of lower portion of nose section | 3° |
| Θ2 | Angle of upper portion of nose section | 25° |
| Θ3 | Angle of front windshield | 36° |
| Θ5 | Angle of roof | 47° |
| L1 | Distance between axis of rotation of wheels and top of upper portion of nose section | 1890 mm |
| L2 | Distance between axis of rotation of wheels and intersection of lower portion and upper portion of nose section | 1900 mm |
| L3 | Distance between axis of rotation and the lowermost point of the nose section | 1500 mm |
| L4 | Distance between rear of tractor unit and the top edge of windshield | 4180 mm |
| L5 | Distance between rear of tractor unit and the bottom edge of windshield | 4035 mm |
| L6 | Distance between rear of tractor unit and the front of nose section | 4570 mm |
| L7 | Overall length of tractor unit | 5275 mm |
| L8 | Distance between axis of rotation of wheel and front edge of door | 990 mm |
| L9 | Distance between axis of rotation of wheel and rear edge of door | 2060 mm |
| L10 | Distance between axis of rotation of wheel and rear of tractor unit | 3760 mm |
| L11 | Distance between axis of rotation of wheel and front of nose section | 1515 mm |
| L12 | Length of lower portion of nose section | 995 mm |
| L13 | Length of upper portion of nose section | 650 mm |
| L14 | Rise of upper portion of nose section | 545 mm |
| L15 | Length of windshield | 955 mm |
| L16 | Rise of windshield | 755 mm |
| L17 | Length of brow | 700 mm |
| L18 | Rise of brim | 490 mm |
| L21 | Offset at top of windshield | 1110 mm |
| L22 | Offset at top of brow | 1580 mm |
| W1 | Width of rear of tractor unit | 2510 mm |
| W2 | Width of top of windshield | 1640 mm |
| W3 | Width of bottom of windshield | 1215 mm |
| W4 | Width of tractor unit | 2350 mm |

In an embodiment, a ratio of Θ2 to Θ3 is between about 0.6 and 1.0, or between about 0.7 and about 0.9, or about 0.8. As used herein, "about 0.8" means within 10%, 5%, 3%, or 1% of 0.8. In an embodiment, a ratio of Θ1 to Θ2 is between about 0.05 and 0.15, or about 0.1. As used herein, "about 0.1" means within 10%, 5%, 3%, or 1% of 0.1. In an embodiment, a ratio of Θ1 to Θ3 is between about 0.02 and 0.15, or about 0.07. As used herein, "about 0.07" means within 10%, 5%, 3%, or 1% of 0.7.

Figure 10C:
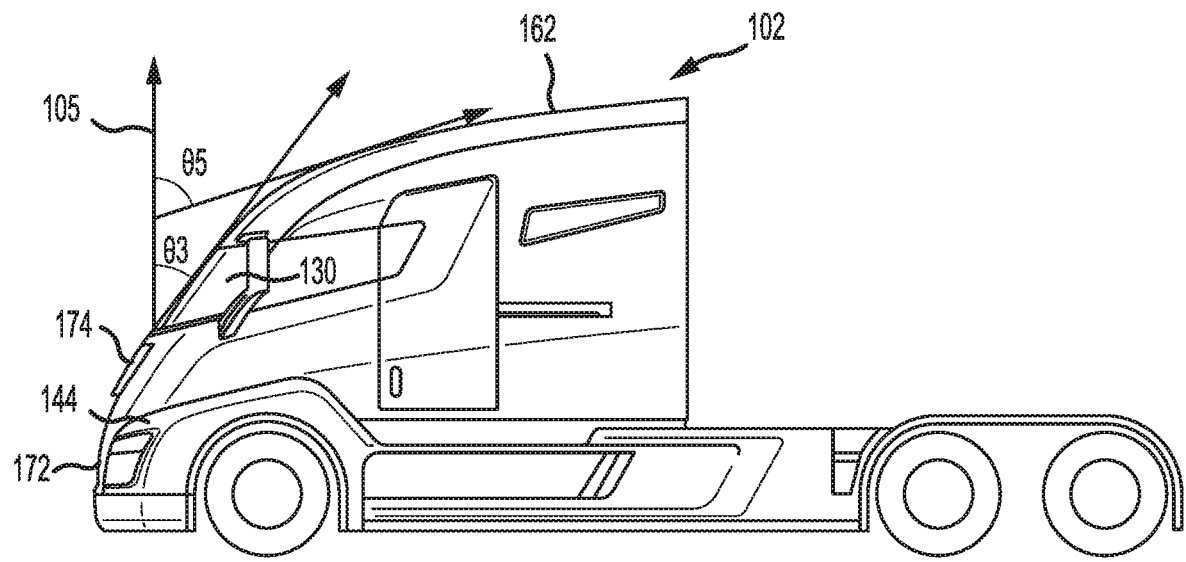
FIG. 10C is a side view of the vehicle of FIG. 10A with various angles indicated.
Figure 10D:
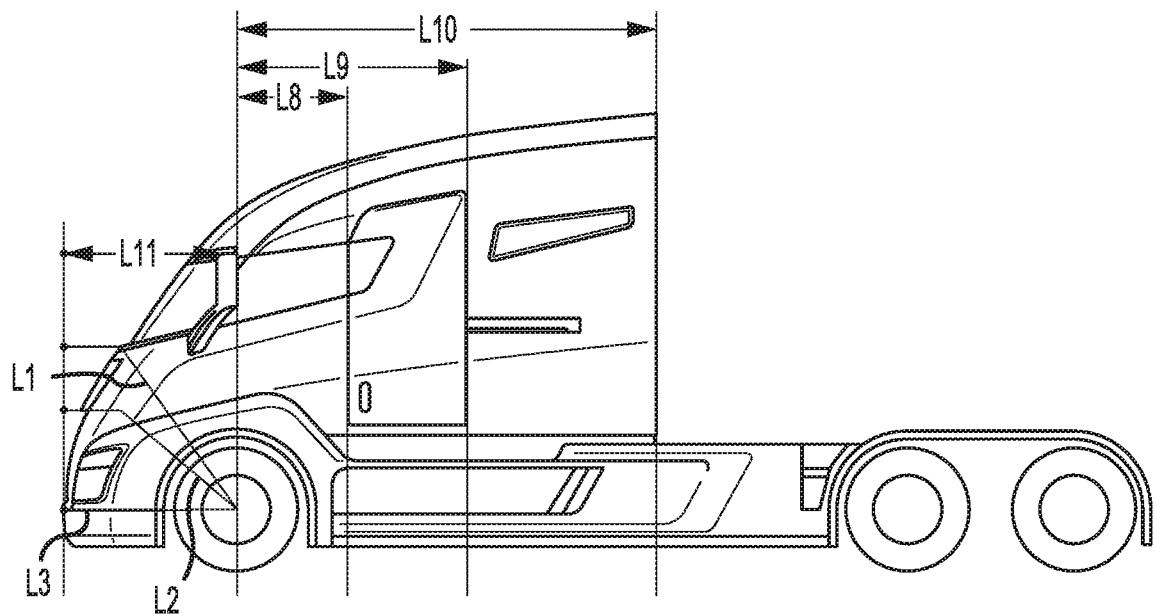
FIG. 10D is a side view of the vehicle of FIG. 10A with various dimensions indicated.
Figure 10E:
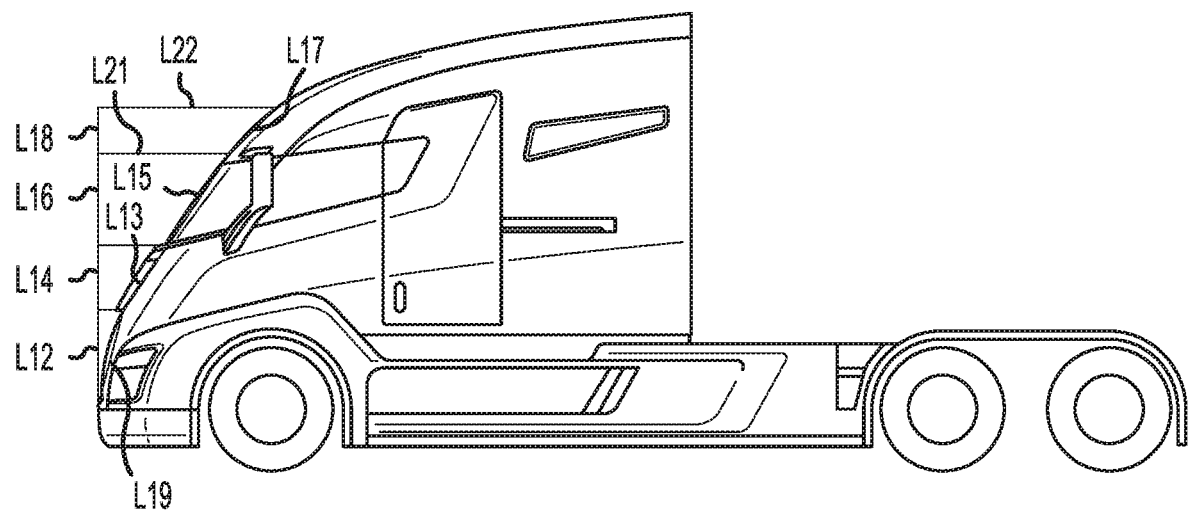
FIG. 10E is a side view of the vehicle of FIG. 10A with various dimensions indicated.

Referring to FIG. 10C the roof section 162 may define a slope angle Θ5 measured from a vertical axis 105. The angle Θ5 lies in a bisecting plane that bisects a width of the vehicle body 102 along its longitudinal length. The angle Θ5 is between 42° and 52°, 45° and 50°, or about 47°. In this case "about 47°" means within one of 10%, 5% or 3% of 47°.

In an embodiment, a ratio of Θ3 to Θ5 is between 0.7 and 0.9, or between 0.75 and 0.82, or about 0.77. As used herein, "about 0.77" means within 10%, 5%, or 3% of 0.77.

From the slope angles Θ1, Θ2, Θ3, and Θ5 of vehicle 100 (see FIGS. 10B and 10C) the slope of the lower portion 174, the upper portion 172, the windshield 130, and the roof 162 may be determined using the geometric relationship Tan (90−Θ)=slope. Accordingly, the slope of the lower portion 174 is about 19.1; the slope of the upper portion 172 is about 2.1; the slope of the windshield 130 is about 1.4. The slope of the roof section 162 is about 0.9. Additionally, it will be appreciated that the slope values identified above mean within 15%, 10%, 5%, 3%, or 1% of the stated value.

In an embodiment, a ratio of the vertical rise, L12, of the lower portion 174 of the nose 164 to the vertical rise, L14, of the upper portion 172 of the nose section 164 is defined as L12/L14. This ratio is between about 0.6 and 1.2, or about 0.9. As used herein, "about 0.9" means within 10%, 5%, 3%, or 1% of 0.9.

In an embodiment, a ratio of the vertical rise, L12, of the lower portion 174 of the nose 164 to the total rise (L12+L14) of the nose section 164 is defined as L12/(L12+L14). This ratio is between about 0.25 and 0.75, or about 0.48. As used herein, "about 0.48" means within 10%, 5%, 3%, or 1% of 0.48.

Figure 14:
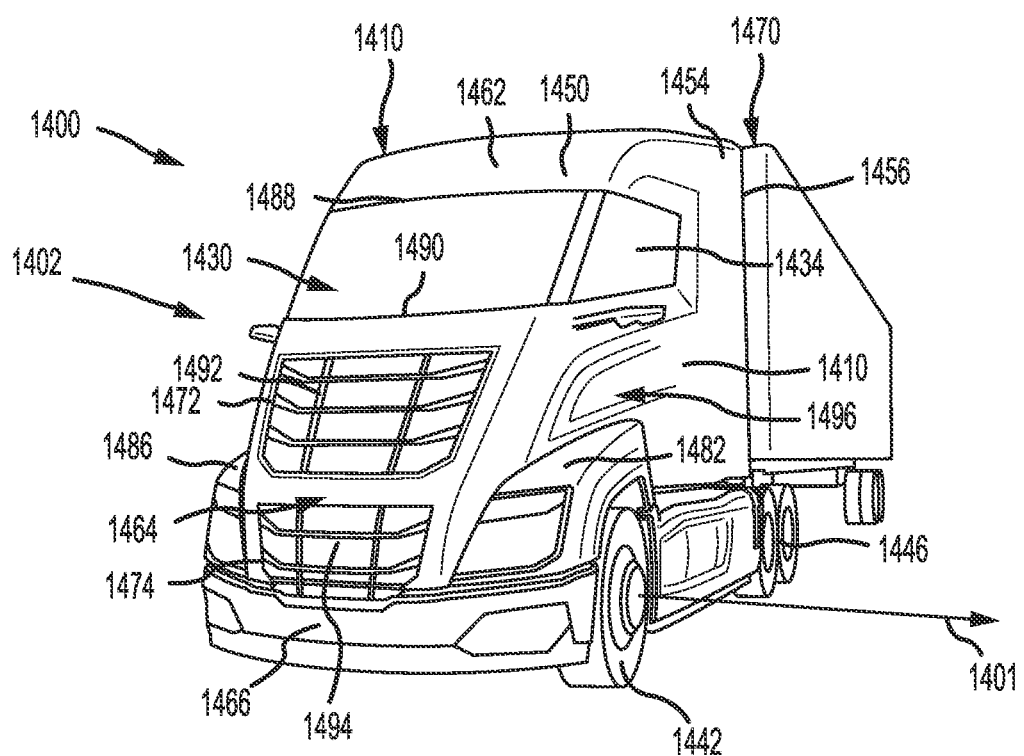
FIG. 14 illustrates a perspective view of a vehicle in accordance with the present disclosure.

Referring to FIG. 14, a vehicle 1400 coupled to a trailer 1470 is illustrated. In various embodiments, vehicle 1400 comprises a vehicle body 1402 having a day cab configuration. The vehicle 1400 and the trailer 1470 may be coupled using a fifth wheel hitch as known to one of ordinary skill. In various embodiments, vehicle 1400 comprises a class 8 heavy-duty truck. For example, vehicle 1400 can comprise a day cab-style class 8 heavy duty truck.

Similar to vehicle 100 of FIG. 1, vehicle 1400 can comprise a wheel 1442 on each side (only driver side wheel visible). Vehicle 1400 may further comprise rear wheels 1446. For example, the rear wheels 1446 may be positioned such that two wheels are mounted on each side of vehicle 1400.

In various embodiments, a wind deflector 1454 is disposed on the rear of vehicle body 1402. The wind deflector 1454 may extend from the rear of vehicle 1400 and may deflect wind from a front surface of the trailer 1470. That is, the wind deflector 1454 may decrease drag generated by vehicle 1400 and trailer 1470.

Figure 19:
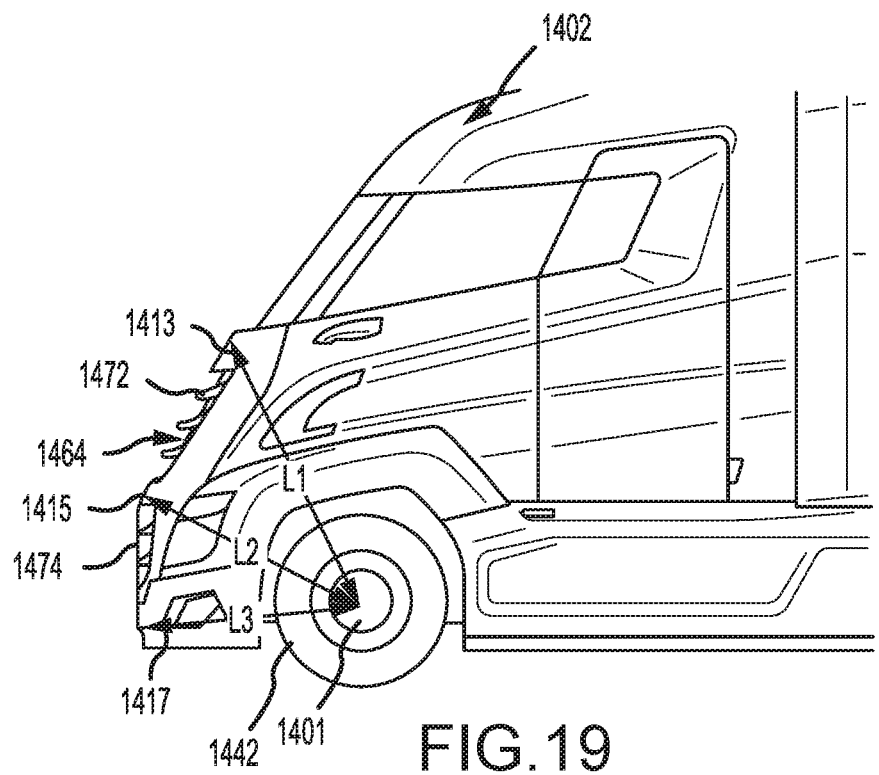
FIG. 19 illustrates various lengths between a center of an axis of rotation of the front wheels of the vehicle shown in FIG. 14.
Figure 20:
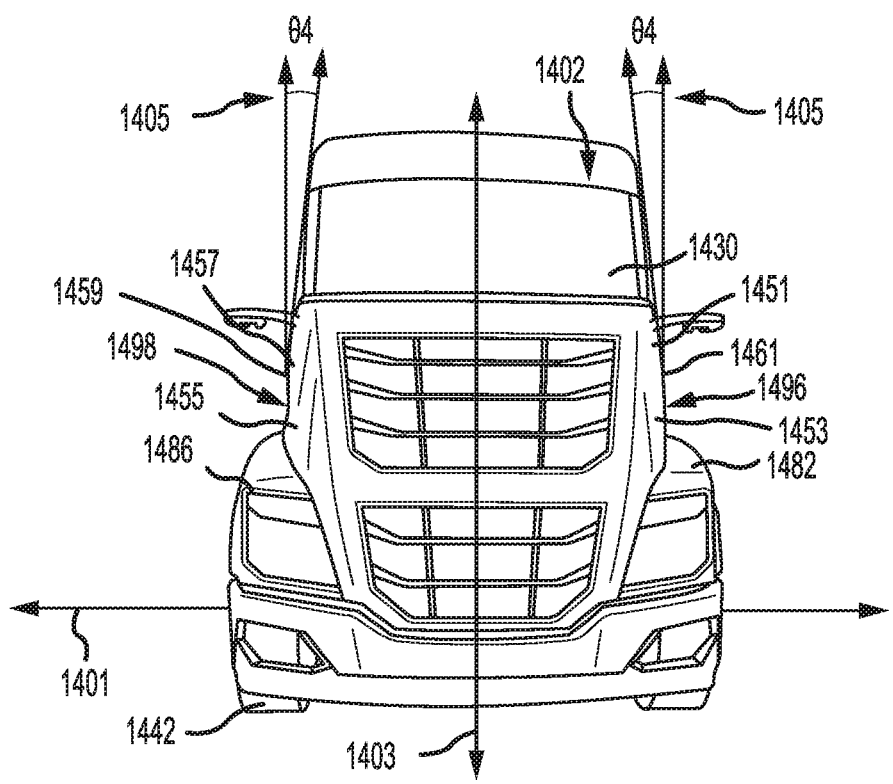
FIG. 20 illustrates a taper angle of a driver side section and a passenger side section of the vehicle shown in FIG. 14.

Referring to FIGS. 14, 19, and 20, the wheels 1442, when steered straight, may rotate around an axis 1401 that is perpendicular to a bisecting plane 1403 that bisects a width of vehicle 1400. It will be appreciated that the bisecting plane 1403 is vertically oriented with respect to vehicle 1400 and is orthogonal to the ground.

Referring back to FIG. 14, vehicle body 1402 of vehicle 1400 further comprises a roof section 1462, a front windshield 1430, a nose section 1464, a bumper 1466, a driver side section 1496, and a passenger side section 1498 (see FIG. 20). The front windshield 1430 may extend from a top edge 1488 to a bottom edge 1490 and may be a wrap-around windshield.

The nose section 1464 of the vehicle body 1402 is situated below the front windshield 1430 and between a driver side fender 1482 and a passenger side fender 1486. The nose section 1464 may include an upper portion 1472 and a lower portion 1474. The upper portion 1472 may be disposed directly beneath the front windshield 1430 while the lower portion 1474 is separated from the windshield 1430 by the upper portion 1472. That is, the lower portion 1474 is disposed below the upper portion 1472 on the nose section 1464.

The upper portion 1472 may include an upper grille 1492 and the lower portion 1474 may include a lower grille 1494. Alternatively, the upper portion 1472 may not include a grille and/or the lower portion 1474 may not include a grille. In this case, the upper portion 1472 and/or the lower portion 1474 have a solid surface in place of the upper grille 1492 and the lower grille 1494, respectively.

The vehicle body 1402 may enclose a cabin 1450. Located within the cabin 1450 is a driver's seat, steering wheel, electronics and other controls for the vehicle 1400. The driver side section 1496 includes a door 1410 to provide access to the interior of the cabin 1450. The positioning of the door 1410 may be behind the driver's seat. The vehicle body 1402 may further include a driver side window 1434 and a passenger side window (not visible in FIG. 14) that are part of the wrap-around front windshield 1430. Part of the wrap-around front windshield 1430 may be located on the door 1410.

As mentioned above, the vehicle body 1402 includes a driver side fender 1482 and a passenger side fender 1486 disposed on either side of the nose section 1464. The vehicle body 1402 may further include one or more steps 1440 (not shown on FIG. 14).

In an embodiment of the present disclosure, the vehicle 1400 is an electric powered semi-truck having an electric motor and associated gear train at one or more wheels. For example, vehicle 1400 can include an electric motor and associated gear train at every wheel.

In an embodiment, the vehicle body 1402 of the vehicle 1400 may have a mono-volume shape that provides for a larger interior cabin space. The drive train components (not shown) are disposed under the floorboard and there is no engine in the front of the vehicle. The mono-volume shape provides several advantages, including increased interior space of cabin 1450, more interior features and storage, larger sleeper area inside the cabin 1450, forward placement of the driver and better view of the road and traffic for increased safety, and a reduced nose in the front of the vehicle body 1402 that allows a driver to see vehicles as close as five (5) feet in front of the vehicle 1400.

Figure 15:
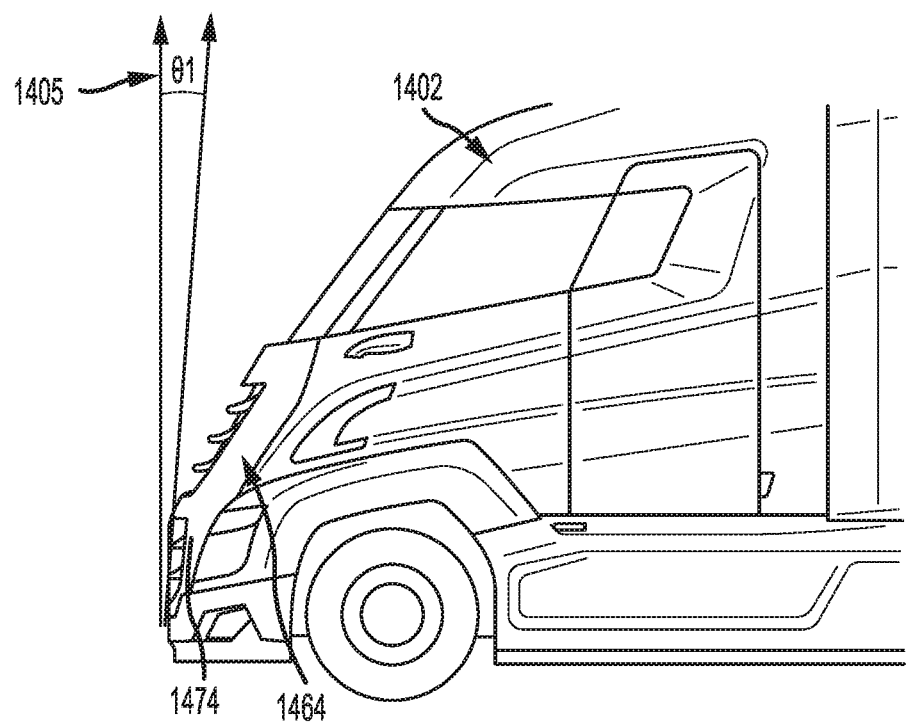
FIG. 15 illustrates a slope angle of a lower portion of a nose section of the vehicle shown in FIG. 14.

Referring to FIG. 15, the lower portion 1474 of the nose section 1464 may define a slope angle Θ1 measured from a vertical axis 1405. The angle Θ1 lies in a bisecting plane 1403 that bisects a width of the vehicle body 1402 along its longitudinal length as shown in FIGS. 19 and 20. The angle Θ1 is between about 0° and about 6°, about 1.5° and about 3.75°, or about 2.69°. In this case "about 2.69°" means within one of 10%, 5%, 3%, or 1% of 2.69°. In an embodiment, the angle Θ1 is between a range of about 0° and about 6° or between about 0° and about 3.75°.

Figure 16:
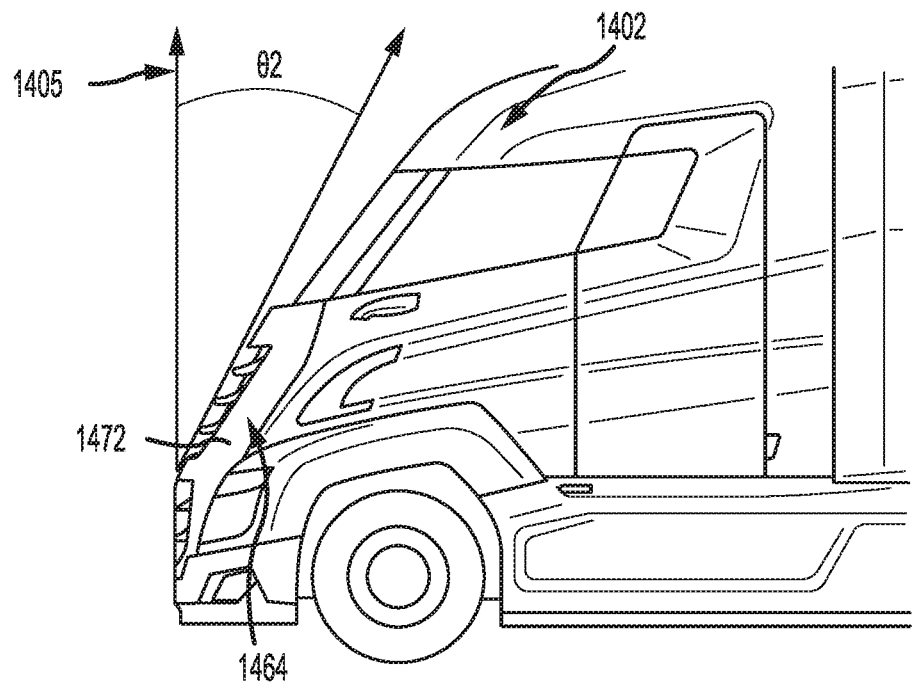
FIG. 16 illustrates a slope angle of an upper portion of the nose section of the vehicle shown in FIG. 14.

Referring to FIG. 16, the upper portion 1472 of the nose section 1464 may define a slope angle Θ2 measured from the vertical axis 1405. The angle Θ2 may lie in the bisecting plane 1403 (see FIGS. 19 and 20). The angle Θ2 is between about 24° and about 35°, about 28° and about 31°, or about 29.4°. In this case "about 29.4°" means within one of 10%, 5%, 3%, or 1% of 29.4°.

Figure 17:
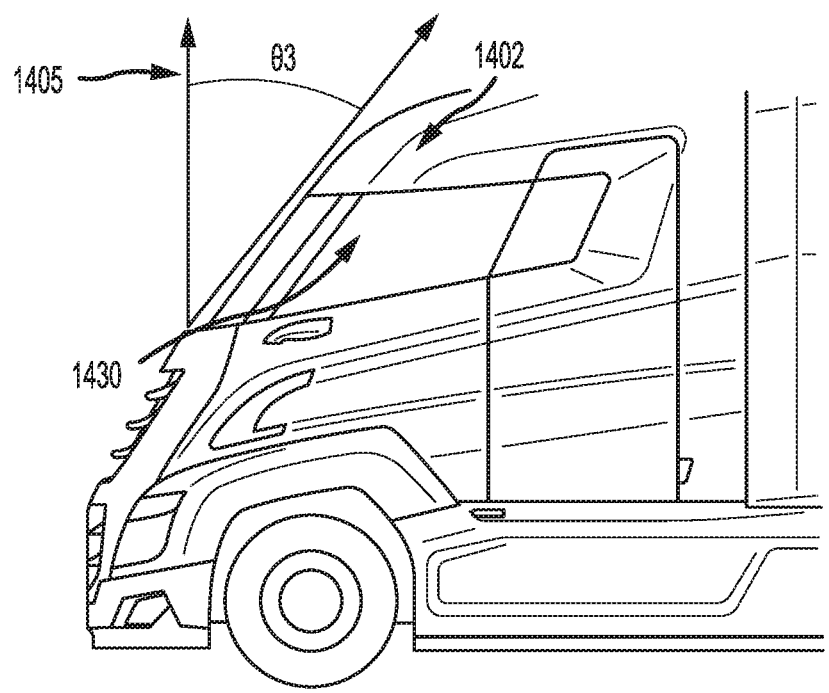
FIG. 17 illustrates a slope angle of a front windshield of the vehicle shown in FIG. 14.

Referring to FIG. 17, the front windshield 1430 may define a slope angle Θ3 measured from the vertical axis 1405. The angle Θ3 may lie in the bisecting plane 1403 (see FIGS. 19 and 20). The angle Θ3 is between about 31° and about 42°, about 35° and about 39°, or about 36.8°. In this case "about 36.8°" means within one of 10%, 5%, 3%, or 1% of 36.8°.

In an embodiment, a ratio of Θ2 to Θ3 is between about 0.6 and 1.0, or between about 0.7 and about 0.9, or about 0.8. As used herein, "about 0.8" means within 10%, 5%, 3%, or 1% of 0.8. In an embodiment, a ratio of Θ1 to Θ2 is between about 0.05 and 0.15, or about 0.1. As used herein, "about 0.1" means within 10%, 5%, 3%, or 1% of 0.1. In an embodiment, a ratio of Θ1 to Θ3 is between about 0.02 and 0.15, or about 0.07. As used herein, "about 0.07" means within 10%, 5%, 3%, or 1% of 0.07.

Figure 18:
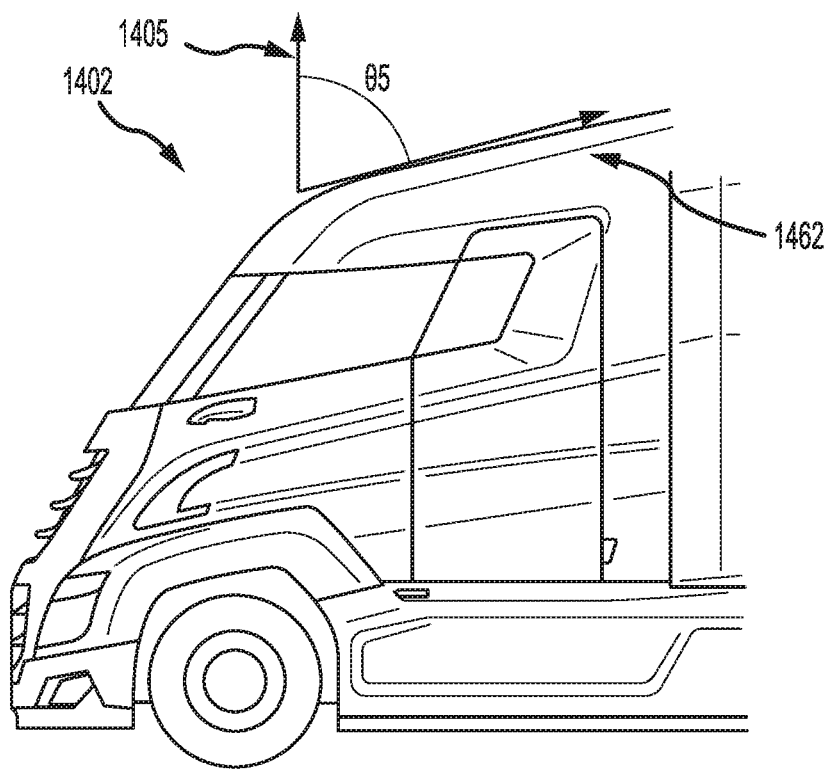
FIG. 18 illustrates a slope angle of a roof of the vehicle shown in FIG. 14.

Referring to FIG. 18, the roof section 1462 may define a slope angle Θ5 measured from a vertical axis 1405. The angle Θ5 lies in a bisecting plane 1403 that bisects a width of the vehicle body 1402 along its longitudinal length as shown in FIGS. 19 and 20. The angle Θ5 is between 65° and 80°, 70° and 79°, or about 76.3°. In this case "about 76.3°" means within one of 10%, 5% or 3% of 76.3°.

In an embodiment, a ratio of Θ3 to Θ5 is between 0.3 and 0.7, or between 0.35 and 0.65, or about 0.48. As used herein, "about 0.48" means within 10%, 5%, or 3% of 0.48.

From the slope angles Θ1, Θ2, Θ3, Θ4, and Θ5 of vehicle 1400 (see FIGS. 15, 16, 17 and 20, respectively), the slope of the lower portion 1474, the upper portion 1472, the windshield 1430, the upper surfaces 1453 and 1457, and the roof section 1462 may be determined using the geometric relationship Tan(90−Θ)=slope. Accordingly, the slope of the lower portion 1474 is about 21.3; the slope of the upper portion 1472 is about 1.8; the slope of the windshield 1430 is about 1.3; and the slope of the taper of the upper surfaces 1453 and 1457 is about 16.7. The slope of the roof section 1462 is 0.24. Additionally, it will be appreciated that the slope values identified above mean within 15%, 10%, 5%, 3%, or 1% of the stated value.

Figure 21:
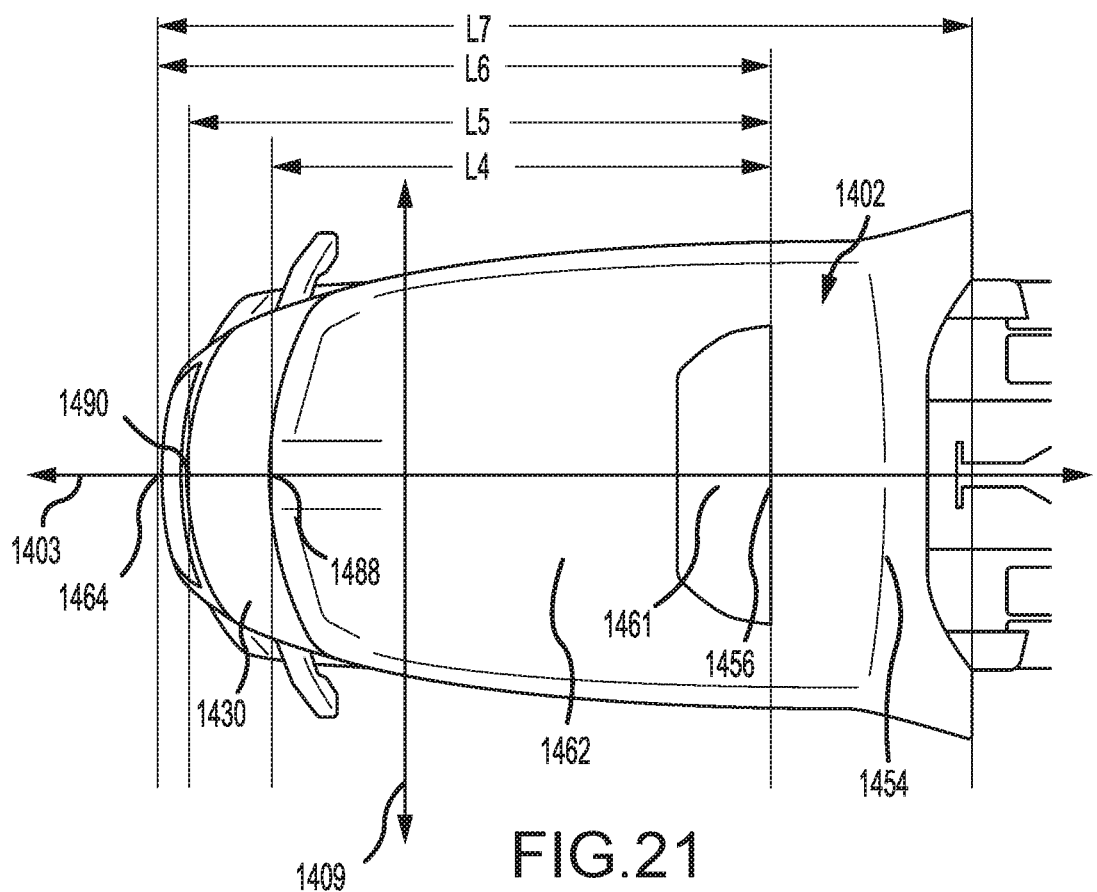
FIG. 21 illustrates a top view of the vehicle shown in FIG. 14 with various lengths identified as well as a bisecting plane.

Referring to FIG. 19, the upper portion 1472 of the nose section 1464 may terminate at an uppermost point 1413 in the bisecting plane 1403 (see FIGS. 20 and 21). The upper portion 1472 and the lower portion 1474 may converge at a transition point 1415 in the bisecting plane 1403 (see FIGS. 19 and 20). The lower portion 1474 may terminate at a lowermost point 1417 in the bisecting plane 1403 (see FIGS. 19 and 20).

A length L1 may define a distance between the axis 1401 and the uppermost point 1413 of the nose section 1464 in the bisecting plane 1403 (see FIGS. 19 and 20). A length L2 may define a distance between the axis 1401 and the transition point 1415 of the nose section 1464 in the bisecting plane 1403 (see FIGS. 19 and 20). A length L3 may define a distance between the lowermost point 1417 of the nose section 1464 and the axis 1401 in the bisecting plane 1403 (see FIGS. 19 and 20).

Referring to FIG. 20, the driver side section 1496 comprises a lower surface 1453 and an upper surface 1451 located above the driver side fender 1482 and below the windshield 1430. The lower surface 1453 is disposed adjacent and above the driver side fender 1482, and the upper surface 1451 is interposed between the lower surface 1453 and the windshield 1430. The lower surface 1453 tapers slightly outward as it extends upwardly from the driver side fender 1482 and towards the upper surface 1451. At a transition 1461 between the lower surface 1453 and the upper surface 1451, the upper surface 1451 begins tapering inward at an angle Θ4 measured from the vertical axis 1405 and in a plane 1409 (see FIG. 21) that is orthogonal to the bisecting plane 1403.

Similarly, the passenger side section 1498 comprises a lower surface 1455 and an upper surface 1457 located above the passenger side fender 1486 and below the windshield 1430. At a transition 1459 between the lower surface 1455 and the upper surface 1457, the upper surface 1457 begins tapering inward at an angle Θ4 measured from the vertical axis 1405 and in the plane 1409 (see FIG. 21). The angle Θ4 is between about 1° and about 6°, about 2° and about 5°, or about 3° and about 4°, or about 3.4°. In this case "about 3.4°" means within one of 10%, 5%, 3%, or 1% of 3.4°.

Referring to FIG. 21, a length L4 may define a distance between a rear 1456 of the vehicle body 1402 and the top edge 1488 of the windshield 1430 in the bisecting plane 1403. A length L5 may define a distance between the rear 1456 of the vehicle body 1402 and the bottom edge 1490 of the windshield 1430 in the bisecting plane 1403. A length L6 may define a distance between the nose section 1464 and the rear 1456 of the vehicle body 1402 in the bisecting plane 1403. A length L7 may define a distance between a rearmost portion of the wind deflector 1454 and the nose section 1464 in the bisecting plane 1403.

In an embodiment, a ratio of the horizontal length of the whole nose (L6−L5) to the horizontal length of the windshield (L5−L4) is defined as (L6−L5)/(L5−L4). This ratio, (L6−L5)/(L5−L4), is between about 0.25 and 1.5, or about 0.75. As used herein, "about 0.75" means within 10%, 5%, 3%, or 1% of 0.75.

In an embodiment, a ratio of the horizontal length of the whole nose (L6−L5) to the horizontal length of the nose to the windshield (L6−L4) is defined as (L6−L5)/(L6−L4). This ratio, (L6−L5)/(L6−L4), is between about 0.2 and 0.8, or about 0.4. As used herein, "about 0.4" means within 10%, 5%, 3%, or 1% of 0.4.

In various embodiments, an air channel or scoop 1461 is formed in the roof section 1462. The air channel 1461 is a large depressed area (roughly 5 feet wide by 6 inches deep) that acts as an air channel and air duct that channels air flow under the wind deflector 1454 and towards rear 1456. For example, air passed through air channel 1461 can be used to cool components positioned on rear 1456. In various embodiments, air passed through air channel 1461 can cool electrical components and/or batteries directly, or through an air-air cooling apparatus (e.g., an intercooler), or through an air-liquid cooling apparatus (e.g., a heat exchanger).

Figure 22:
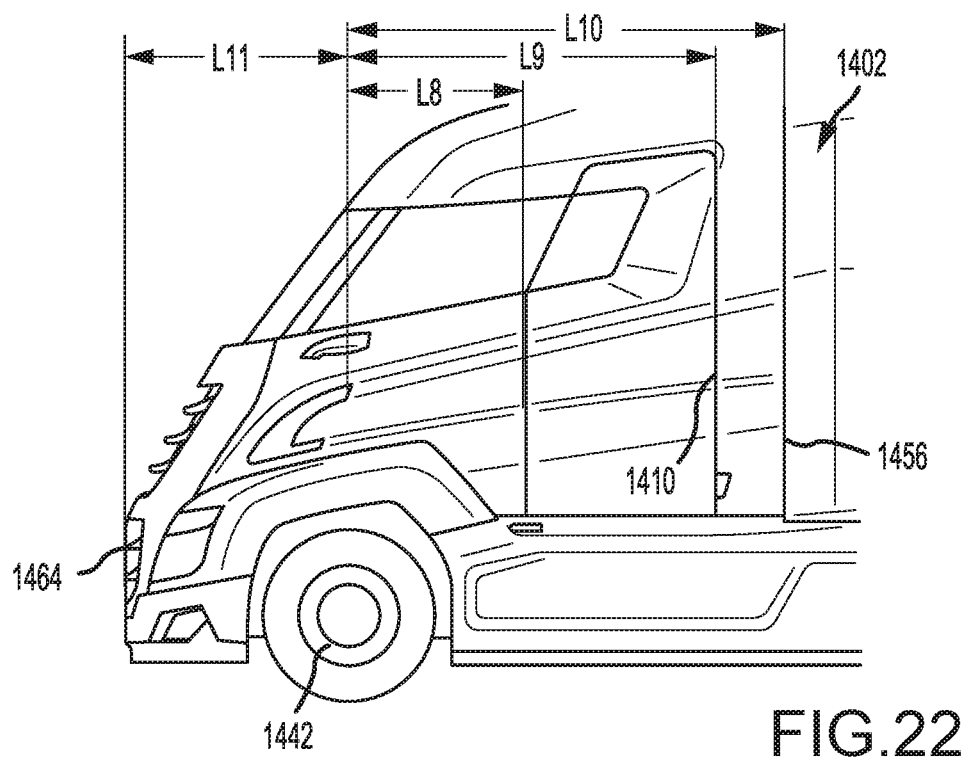
FIG. 22 illustrates a side view of the vehicle shown in FIG. 14 with various lengths identified.

Referring to FIG. 22, a length L8 may define a distance between a center of the wheel 1442 and the front edge of the door 1410. A length L9 may define a distance between the center of the wheel 1442 and the rear edge of the door 1410. A length L10 may define a distance between a center of the wheel 1442 and the rear 1456 of the vehicle body 1402. A length L11 may define a distance between the nose section 1464 and the center of the wheel 1442.

Figure 23:
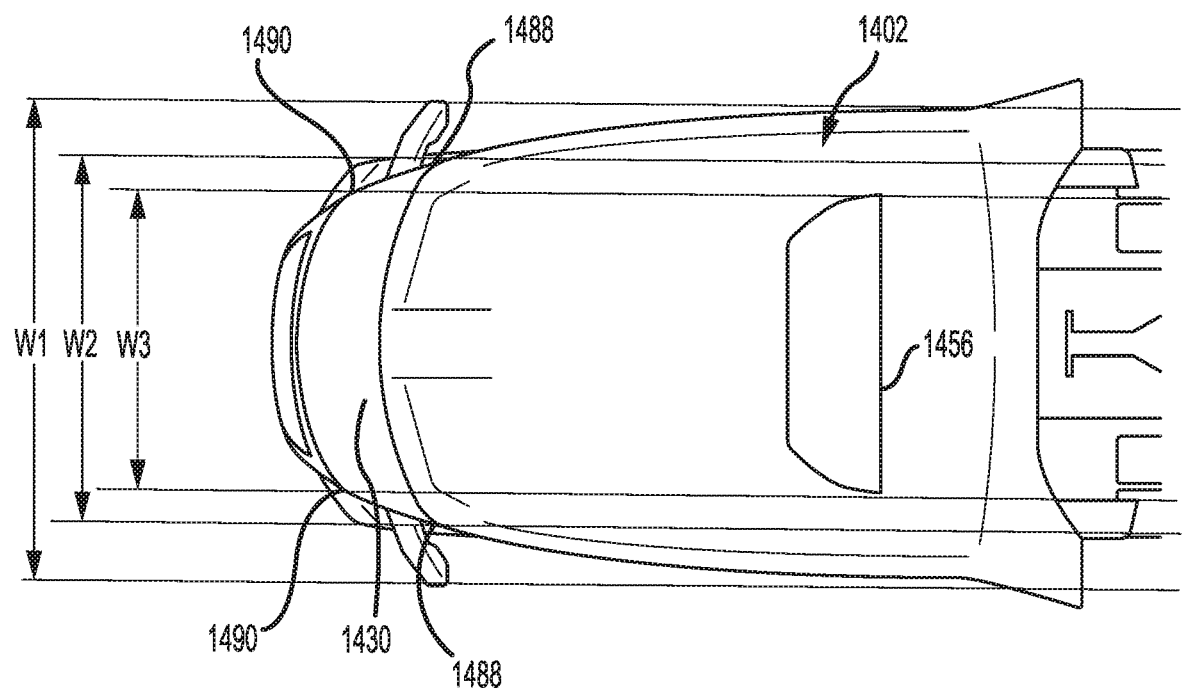
FIG. 23 illustrates a top view of the vehicle shown in FIG. 14 with various widths identified.

Referring to FIG. 23, a width W1 may define a width of the vehicle body 1402 along its rear 1456. A width W2 may define a width between the outermost points of the top edge 1488 of the windshield 1430. A width W3 may define a width between the outermost points of the bottom edge 1490 of the windshield 1430.

Figure 24:
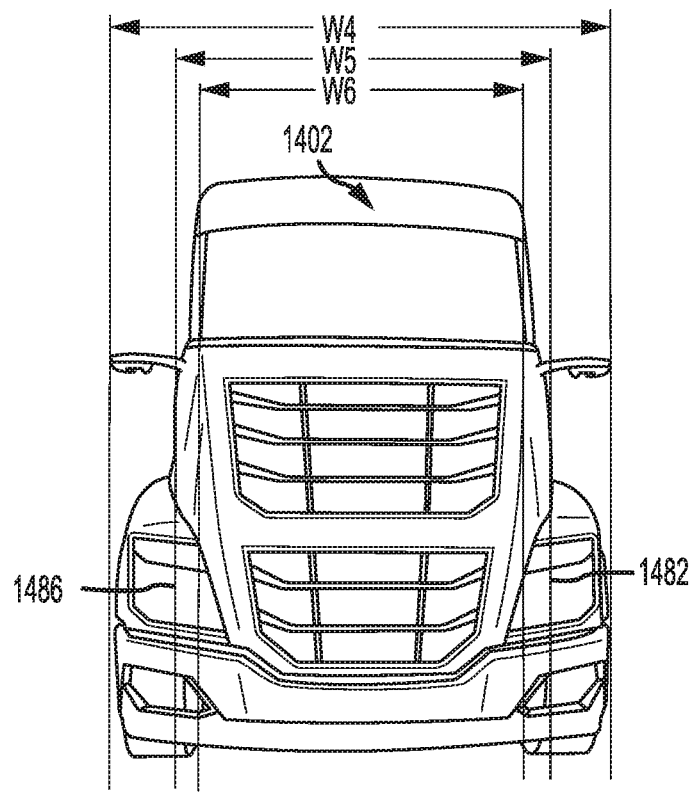
FIG. 24 illustrates a front view of the vehicle shown in FIG. 14 with various widths identified.

Referring to FIG. 24, a width W4 may define a maximum width of the vehicle body 1402 between the fenders 1482 and 1486. A width W5 may define a maximum width of the vehicle body 1402 above the fenders 1482 and 1486. A width W6 may define a minimum width of the vehicle body 1402 above the fenders 1482 and 1486.

Figure 25:
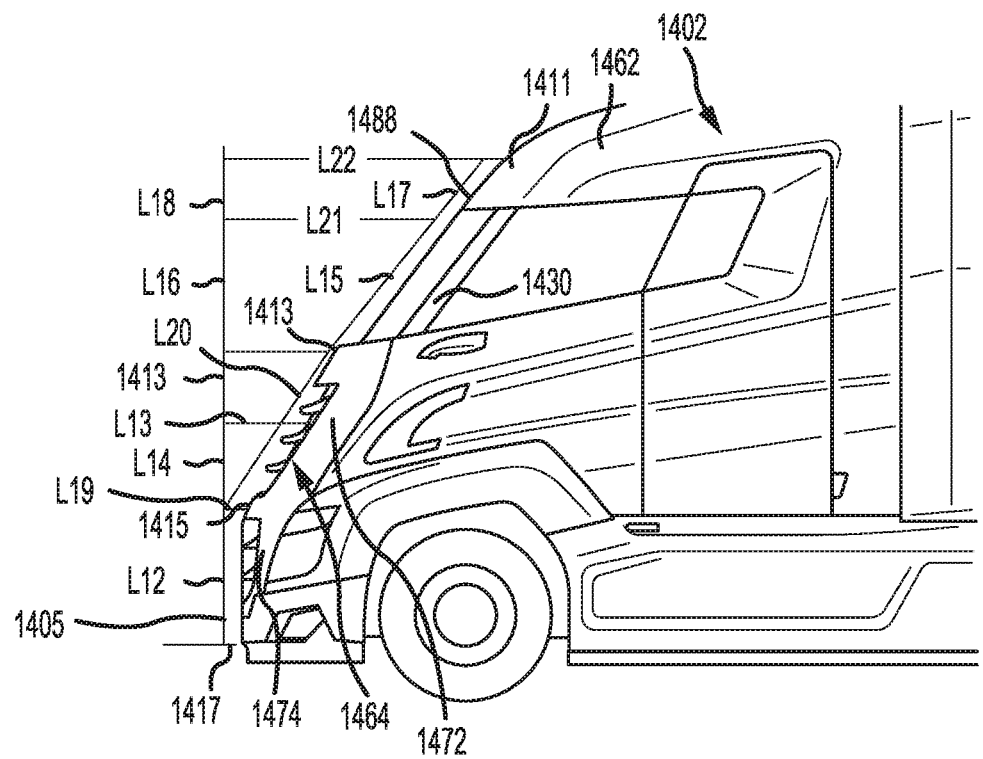
FIG. 25 illustrates a side view of the vehicle shown in FIG. 14 with various lengths identified for the nose section and front windshield.

Referring to FIG. 25, where the measurements reside in the bisecting plane 1403 (see FIGS. 20 & 21), the lower portion 1474 of the nose section 1464 may have a vertical rise of L12. The upper portion 1472 of the nose section 1464 may have a length of L13. The upper portion 1472 of the nose section 1464 may also have a vertical rise of L14. The front windshield 1430 may have a length of L15. The front windshield 1430 may have a vertical rise of L16. A brow 1411 of the roof section 1462 may have a length of L17. The brow 1411 may have a vertical rise of L18.

In an embodiment, a ratio of the vertical rise, L12, of the lower portion 1474 of the nose section 1464 to the vertical rise, L14, of the upper portion 1472 of the nose section 1464 is defined as L12/L14. This ratio is between about 0.6 and 1.2, or about 0.9. As used herein, "about 0.9" means within 10%, 5%, 3%, or 1% of 0.9.

In an embodiment, a ratio of the vertical rise, L12, of the lower portion 1474 of the nose section 1464 to the total rise (L12+L14) of the nose section 1464 is defined as L12/(L12+L14). This ratio is between about 0.25 and 0.75, or about 0.48. As used herein, "about 0.48" means within 10%, 5%, 3%, or 1% of 0.48.

A vertical line 1405 residing in the bisecting plane 1403 (see FIGS. 20 & 21) may pass through the lowermost point 1417 of the lower portion 1474 of the nose section 1464. The vertical line 1405 may be generally oriented in a vertical direction with vehicle body 1402 and be 90° from the ground and perpendicular to the horizontal axis 1401 (see FIG. 20). Due to the slope angle Θ1 of the lower portion 1474 (see FIG. 15), the transition point 1415 between the upper portion 1472 and the lower portion 1474 may be offset from the vertical line 1405 by a length L19.

Likewise, due to the slope angle Θ2 of the upper portion 1472 (see FIG. 16), the uppermost point 1413 of the upper portion 1472 may be offset from the vertical line 1423 by a length L20. Due to the slope angle Θ3 of the windshield 1430 (see FIG. 17), the top edge 1488 of the windshield 1430 may be offset from the vertical line 1423 by a length L21. Due to the slope of the brow 1411, the brow 1411 of the roof section 1462 may be offset from the vertical line 1423 by a length L22.

Table 2 summarizes various physical dimensions, including approximate lengths, widths, heights, and relative angles, of vehicle body 1402.

TABLE 2

Physical Dimensions and Angles of Vehicle 1400

| Variable | Description | Value |
| --- | --- | --- |
| Θ1 | Angle of lower portion of nose section | 3° |
| Θ2 | Angle of upper portion of nose section | 29° |
| Θ3 | Angle of front windshield | 37° |
| Θ4 | Angle of taper on driver and passenger side sections | 3° |
| Θ5 | Angle of roof | 77° |
| L1 | Distance between axis of rotation of wheels and top of upper portion of nose section | 1730 mm |
| L2 | Distance between axis of rotation of wheels and intersection of lower portion and upper portion of nose section | 1430 mm |
| L3 | Distance between axis of rotation and the lowermost point of the nose section | 1330 mm |
| L4 | Distance between rear of tractor unit and the top edge of windshield | 2590 mm |
| L5 | Distance between rear of tractor unit and the bottom edge of windshield | 3350 mm |
| L6 | Distance between rear of tractor unit and the front of nose section | 3920 mm |
| L7 | Overall length of tractor unit | 4805 mm |
| L8 | Distance between axis of rotation of wheel and front edge of door | 1020 mm |
| L9 | Distance between axis of rotation of wheel and rear edge of door | 2180 mm |
| L10 | Distance between axis of rotation of wheel and rear of tractor unit | 2600 mm |
| L11 | Distance between axis of rotation of wheel and front of nose section | 1345 mm |
| L12 | Length of lower portion of nose section | 855 mm |
| L13 | Length of upper portion of nose section | 1045 mm |
| L14 | Rise of upper portion of nose section | 915 mm |
| L15 | Length of windshield | 1065 mm |
| L16 | Rise of windshield | 860 mm |
| L17 | Length of brow | 550 mm |
| L18 | Rise of brim | 475 mm |
| L19 | Offset at transition point | 50 mm |
| L20 | Offset at top of upper portion | 500 mm |
| L21 | Offset at top of windshield | 1300 mm |
| L22 | Offset at top of brow | 1615 mm |
| W1 | Width of rear of tractor unit | 2400 mm |
| W2 | Width of top of windshield | 1765 mm |
| W3 | Width of bottom of windshield | 1695 mm |
| W4 | Width of tractor unit | 2400 mm |
| W5 | Max width of tractor unit above fenders | 2170 mm |
| W6 | Min width of tractor unit above fenders | 1625 mm |

It will be appreciated that in various embodiments of the present disclosure that any particular value or values in the above Table 2 may vary by plus or minus 15%, 10%, 5%, 3%, and/or 1%.

Figure 26:
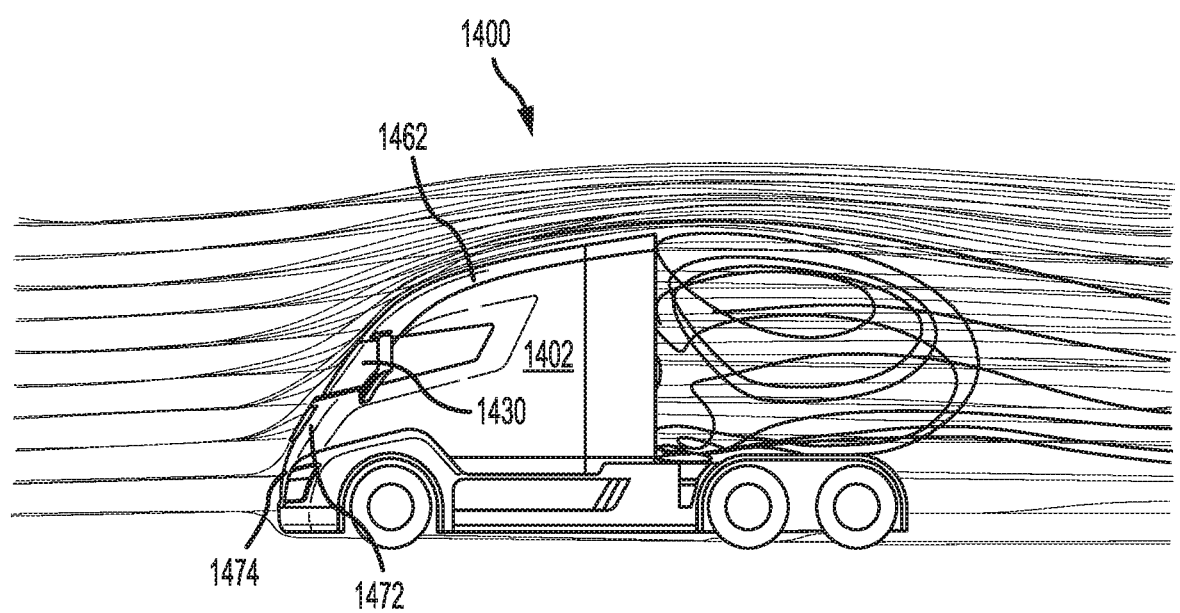
FIG. 26 illustrates a side view of a wind tunnel simulation of the vehicle shown in FIG. 14 that depicts improved airflow over the body of the tractor unit.

Referring to FIG. 26, a computer-generated simulation of the vehicle 1400 that shows the improved airflow over its vehicle body 1402 is illustrated. It will be appreciated that the configuration of the vehicle body 1402, as outlined herein, provides a decrease in drag and improved airflow over conventional configurations of tractor units of semi-trucks. For example, the angles and slopes of the nose section 1464 (including the lower portion 1474 and/or the upper portion 1472), the windshield 1430 and the roof section 1462, individually and collectively, provide a decrease in the drag coefficient for an improved aerodynamic flow over the vehicle 1400.

The results of the computer-generated simulation, an external aerodynamic computational fluid dynamics analysis, demonstrates that the vehicle body 1402 has a significant decrease in its drag coefficient as compared to previously available tractor units. In particular, the drag coefficient of the vehicle body 1402 was determined in the simulation by the following equation:

$$C_d = \frac{2 \times F_x}{rho \times v^2 \times A_{ref}}$$

where $F_x$ is the force acting on the vehicle 1400 in the x direction, rho is the density of fluid (1.225 kg/m³), v is free stream velocity, and $A_{ref}$ is the frontal projected area of the vehicle body 1402. The drag coefficient of the vehicle 1400 was found to be between about 0.42 and about 0.6, about 0.42 and about 0.55, about 0.42 and about 0.5, or about 0.42 and about 0.45, or about 0.42. The drag coefficient was determined at speeds between 60 and 65 mph, or about 62 mph. The frontal projected area of the vehicle 1400, $A_{ref}$, is between about 9.5 m² and about 11.0 m², about 9.7 m² and about 10.75 m², about 9.9 m² and about 10.5 m², or about 9.95 m² and about 10.0 m², or about 9.97 m².

EXAMPLES

Examples 1-8—Sleeper Cab Class 8 Semi-Trucks

In Example 1, a truck comprises: a body including a nose section, the nose section having an upper portion and a lower portion; and a bisecting plane that bisects a width of the tractor unit, wherein the lower portion defines a first slope angle taken from vertical and that lies in the bisecting plane, wherein the first slope angle is between a range of about 0° and about 6°, wherein the upper portion defines a second slope angle taken from vertical and that lies in the bisecting plane, wherein the second slope angle is between about 20° and about 30°, and wherein the truck has a drag coefficient that is between about 0.36 and about 0.40.

In Example 2, the truck of Example 1, wherein the drag coefficient $C_d$ is about 0.37, determined by:

$$C_d = \frac{2 \times F_x}{rho \times v^2 \times A_{ref}}$$

where $F_x$ is a force acting on the truck, rho is a fluid density, v is a free stream velocity, and $A_{ref}$ is a frontal projected area of the tractor unit.

In Example 3, the truck of any one of the Examples 1-2, wherein the frontal projected area, $A_{ref}$, is between about 9.6 m² and about 10.6 m².

In Example 4, the truck of any one of the Examples 1-3, wherein the body further comprises a windshield defining a third slope angle taken from vertical and that lies in the bisecting plane; and wherein the third slope angle is between about 31° and about 41°.

In Example 5, the truck of any one of the Examples 1-4, wherein: the first slope angle is between about 2° and about 4°; the second slope angle is between about 23° and about 27°; the third slope angle is between about 34° and about 38°; and the fifth slope angle is between about 42° and about 52°.

In Example 6, the truck of any one of the Examples 1-5, wherein a ratio of the first slope angle to the third slope angle is between about 0.7 and about 0.9.

In Example 7, the truck of any one of the Examples 1-6, wherein the body further comprises a roof section having an air scoop integrally formed therein.

In Example 8, the truck of any one of the Examples 1-7, further comprising a wind deflector disposed on a rear of the tractor unit.

Examples 9-19—Day Cab Class 8 Semi-Trucks

In Example 9, a truck comprises: a body including a nose section, the nose section having an upper portion and a lower portion; and a bisecting plane that bisects a width of the body, wherein the lower portion defines a first slope angle taken from vertical and that lies in the bisecting plane, wherein the first slope angle is between a range of about 0° and about 6°, wherein the upper portion defines a second slope angle taken from vertical and that lies in the bisecting plane, wherein the second slope angle is between about 24° and about 34°, and wherein the tractor unit has a drag coefficient that is between about 0.42 and about 0.46.

In Example 10, the truck of Example 9, wherein the drag coefficient $C_d$ is about 0.42, determined by:

$$C_d = \frac{2 \times F_x}{rho \times v^2 \times A_{ref}}$$

In Example 11, the truck of any one of the Examples 9-10, wherein the frontal projected area, $A_{ref}$, is between about 9.97 m² and about 11.0 m².

In Example 12, the truck of any one of the Examples 9-11, wherein the body further comprises a windshield defining a third slope angle taken from vertical and that lies in the bisecting plane; and wherein the third slope angle is between about 32° and about 42°.

In Example 13, the truck of any one of the Examples 9-12, wherein the body further comprises a roof section; wherein the roof section defines a fourth slope angle taken from vertical and that lies in the bisecting plane; and wherein the fourth slope angle is between about 71° and about 81°.

In Example 14, the truck of any one of the Examples 9-13, wherein: the first slope angle is between about 2° and about 4°; the second slope angle is between about 27° and about 31°; the third slope angle is between about 35° and about 39°; and the fourth slope angle is between about 74° and about 78°.

In Example 15, the truck of any one of the Examples 9-14, wherein a ratio of the first slope angle to the third slope angle is between about 0.7 and about 0.9.

In Example 16, the truck of any one of the Examples 9-15, wherein the body further comprises a roof section having an air scoop integrally formed therein.

In Example 17, the truck of any one of the Examples 9-16, wherein the windshield comprises a wrap-around windshield.

In Example 18, the truck of any one of the Examples 9-17, further comprising a wind deflector disposed on a rear of the tractor unit.

In Example 19, the truck of any one of the Examples 9-18, wherein the body further comprises a driver side section and a passenger side section; wherein at least one of the driver side section and the passenger side section comprises a tapered surface defining a taper angle; wherein the taper angle is between about 1° and about 6°.

In the above disclosure, reference has been made to the accompanying drawings, which form a part hereof, and in which is shown by way of illustration specific embodiments in which the disclosure may be practiced. It is understood that other embodiments may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate embodiments may be used in any combination desired to form additional hybrid embodiments of the disclosure.

Further, although specific embodiments of the disclosure have been described and illustrated, the disclosure is not to be limited to the specific forms or arrangements of parts so described and illustrated. The scope of the disclosure is to be defined by the claims appended hereto, any future claims submitted here and in different applications, and their equivalents. When language similar to "at least one of A, B, or C" or "at least one of A, B, and C" is used in the claims, the phrase is intended to mean any of the following: (1) at least one of A; (2) at least one of B; (3) at least one of C; (4) at least one of A and at least one of B; (5) at least one of B and at least one of C; (6) at least one of A and at least one of C; or (7) at least one of A, at least one of B, and at least one of C.

What is claimed is:

1. A truck comprising:
an outer body including a nose section, the nose section having an upper portion and a lower portion; and
a bisecting plane that bisects a width of the truck,
wherein the lower portion defines a first slope angle taken from vertical and that lies in the bisecting plane,
wherein the first slope angle is between a range of about 0° and about 6°,
wherein the upper portion defines a second slope angle taken from vertical and that lies in the bisecting plane,
wherein the second slope angle is between about 20° and about 30°, and
wherein the truck has a drag coefficient that is between about 0.36 and about 0.40.

2. The truck of claim 1, wherein the drag coefficient, $C_d$, is determined by $$C_d = \frac{2 \times F_x}{rho \times v^2 \times A_{ref}}$$

where $F_x$ is a force acting on the tractor unit, rho is a fluid density, v is a free stream velocity, and $A_{ref}$ is a frontal projected area of the tractor unit.

3. The truck of claim 2, wherein the frontal projected area, $A_{ref}$, is between about 9.6 m² and about 10.6 m².

4. The truck of claim 1, wherein the outer body further comprises a windshield defining a third slope angle taken from vertical and that lies in the bisecting plane, and wherein the third slope angle is between about 31° and about 41°.

5. The truck of claim 4, wherein the outer body further comprises a roof section, wherein the roof section defines a fourth slope angle taken from vertical and that lies in the bisecting plane, and wherein the fourth slope angle is between about 42° and about 52°.

6. The truck of claim 5, wherein:
the first slope angle is between about 2° and about 4°;
the second slope angle is between about 23° and about 27°;
a third slope angle is between about 34° and about 38°; and
the fourth slope angle is between about 45° and about 49°.

7. The truck of claim 4, wherein a ratio of the first slope angle to the third slope angle is between about 0.7 and about 0.9.

8. The truck of claim 1, wherein the outer body further comprises a roof section having an air scoop integrally formed therein.

9. The truck of claim 6, wherein the windshield comprises a wrap-around windshield.

10. A truck comprising:
an outer body including a nose section, the nose section having an upper portion and a lower portion; and
a bisecting plane that bisects a width of the truck,
wherein the lower portion defines a first slope angle taken from vertical and that lies in the bisecting plane,
wherein the first slope angle is between a range of about 0° and about 6°,
wherein the upper portion defines a second slope angle taken from vertical and that lies in the bisecting plane,
wherein the second slope angle is between about 24° and about 34°, and
wherein the tractor unit has a drag coefficient that is between about 0.42 and about 0.48.

11. The truck of claim 10, wherein the drag coefficient, $C_d$, is determined by $$C_d = \frac{2 \times F_x}{rho \times v^2 \times A_{ref}}$$

where $F_x$ is a force acting on the tractor unit, rho is a fluid density, v is a free stream velocity, and $A_{ref}$ is a frontal projected area of the tractor unit.

12. The truck of claim 11, wherein the frontal projected area, $A_{ref}$, is between about 9.97 m² and about 11.0 m².

13. The truck of claim 10, wherein the outer body further comprises a windshield defining a third slope angle taken from vertical and that lies in the bisecting plane, and wherein the third slope angle is between about 32° and about 42°.

14. The truck of claim 13, wherein the outer body further comprises a roof section, wherein the roof section defines a fourth slope angle taken from vertical and that lies in the bisecting plane, and wherein the fourth slope angle is between about 71° and about 81°.

15. The truck of claim 14, wherein:
the first slope angle is between about 2° and about 4°;
the second slope angle is between about 27° and about 31°;
a third slope angle is between about 35° and about 39°; and
the fourth slope angle is between about 74° and about 78°.

16. The truck of claim 13, wherein a ratio of the first slope angle to the third slope angle is between about 0.7 and about 0.9.

17. The truck of claim 10, wherein the outer body further comprises a roof section having an air scoop integrally formed therein.

18. The tractor unit of claim 15, wherein the windshield comprises a wrap-around windshield.

19. The tractor unit of claim 10, wherein the outer body further comprises a driver side section and a passenger side section, wherein at least one of the driver side section and the passenger side section comprises a tapered surface, and wherein the tapered surface defines a taper angle, and wherein the taper angle is between about 1° and about 6°.

20. A truck comprising:
   an outer body including a nose section, the nose section having an upper portion and a lower portion; and
   a bisecting plane that bisects a width of the truck,
      wherein the lower portion defines a first slope angle taken from vertical and that lies in the bisecting plane,
      wherein the first slope angle is between a range of about 2° and about 4°,
      wherein the upper portion defines a second slope angle taken from vertical and that lies in the bisecting plane,
      wherein the second slope angle is between about 25° and about 29°, and
      wherein the truck has a drag coefficient that is between about 0.36 and about 0.48, wherein the drag coefficient, $C_d$, is determined by $$C_d = \frac{2 \times F_x}{rho \times v^2 \times A_{ref}}$$

where $F_x$ is a force acting on the tractor unit, rho is a fluid density, v is a free stream velocity, and $A_{ref}$ is a frontal projected area of the tractor unit, and
   wherein the outer body further comprises a wrap-around windshield defining a third slope angle taken from vertical and that lies in the bisecting plane, and wherein the third slope angle is between about 36° and about 37°.

* * * * *